US007002943B2

(12) United States Patent
Bhagwat et al.

(10) Patent No.: US 7,002,943 B2
(45) Date of Patent: Feb. 21, 2006

(54) METHOD AND SYSTEM FOR MONITORING A SELECTED REGION OF AN AIRSPACE ASSOCIATED WITH LOCAL AREA NETWORKS OF COMPUTING DEVICES

(75) Inventors: Pravin Bhagwat, Kendall Park, NJ (US); Hemant Chaskar, Woburn, MA (US); David C. King, Menlo Park, CA (US); Jai Rawat, Sunnyvale, CA (US)

(73) Assignee: AirTight Networks, Inc., Mountain View, CA (US)

( * ) Notice: Subject to any disclaimer, the term of this patent is extended or adjusted under 35 U.S.C. 154(b) by 0 days.

(21) Appl. No.: 10/966,353

(22) Filed: Oct. 15, 2004

(65) Prior Publication Data

US 2005/0128989 A1 Jun. 16, 2005

Related U.S. Application Data

(60) Provisional application No. 60/560,034, filed on Apr. 6, 2004, provisional application No. 60/543,631, filed on Feb. 11, 2004, provisional application No. 60/610,417, filed on Sep. 16, 2004, provisional application No. 60/610,419, filed on Sep. 16, 2004, provisional application No. 60/607,812, filed on Sep. 8, 2004, provisional application No. 60/607,897, filed on Sep. 8, 2004, provisional application No. 60/569,024, filed on May 7, 2004, provisional application No. 60/527,673, filed on Dec. 8, 2003.

(51) Int. Cl.
*H04Q 7/28* (2006.01)

(52) U.S. Cl. ...................................................... 370/338

(58) Field of Classification Search ..................... None
See application file for complete search history.

(56) References Cited

U.S. PATENT DOCUMENTS 6,754,488 B1 6/2004 Won et al.

(Continued)

FOREIGN PATENT DOCUMENTS

WO WO 2001/093531 A3 6/2001

(Continued)

OTHER PUBLICATIONS

Chirumamilla et al., Agent based intrusion detection and response system for wireless LANs Dept. of Comput. Sci. & Eng., Nebraska Univ., Lincoln, NE, USA This paper appears in: Communications, 2003. ICC '03. IEEE International Conference on Publication Date: May 11-15, 2003 On page(s): 492-496 vol. 1.

(Continued)

*Primary Examiner*—Chi Pham
*Assistant Examiner*—Anh-Vu Ly
(74) *Attorney, Agent, or Firm*—Townsend and Townsend and Crew LLP

(57) ABSTRACT

A method for monitoring a selected region of an airspace associated with local area networks of computing devices is provided. The method includes providing one or more segments of a legacy local area network to be protected in a selected geographic region. The legacy local area network is characterized by an unsecured airspace within the selected geographic region. The method includes determining a security policy associated with the one or more segments of the legacy local area network. The security policy at least characterizes a type of wireless activity in the unsecured airspace to be permitted, denied, or ignored. Additionally, the method includes connecting one or more sniffer devices into the legacy local area network. The one or more sniffer devices are spatially disposed within the selected geographic region to cause at least a portion of the unsecured airspace to be secured according to the security policy.

52 Claims, 26 Drawing Sheets

U.S. PATENT DOCUMENTS

| | | | | |
|---|---|---|---|---|
| 2001/0052014 | A1 | 12/2001 | Sheymov et al. | |
| 2003/0135762 | A1 | 7/2003 | Macaulay | |
| 2003/0185244 | A1 | 10/2003 | Wu et al. | |
| 2003/0186679 | A1 | 10/2003 | Chaffener et al. | |
| 2003/0217283 | A1 * | 11/2003 | Hrastar et al. | 713/200 |
| 2003/0217289 | A1 | 11/2003 | Ammon et al. | |
| 2003/0219008 | A1 | 11/2003 | Hrastar | |
| 2003/0221006 | A1 | 11/2003 | Kuan et al. | |
| 2003/0232598 | A1 | 12/2003 | Alldajeff et al. | |
| 2003/0233567 | A1 | 12/2003 | Lynn et al. | |
| 2003/0236990 | A1 | 12/2003 | Hrastar et al. | |
| 2004/0003285 | A1 | 1/2004 | Whelan et al. | |
| 2004/0008652 | A1 | 1/2004 | Tanzella et al. | |
| 2004/0023640 | A1 | 2/2004 | Ballai | |
| 2004/0028000 | A1 * | 2/2004 | Billhartz | 370/312 |
| 2004/0028017 | A1 | 2/2004 | Whiteill et al. | |
| 2004/0078151 | A1 | 4/2004 | Aljadeff et al. | |
| 2004/0098610 | A1 | 5/2004 | Hrastar | |
| 2004/0137915 | A1 * | 7/2004 | Diener et al. | 455/456.1 |
| 2004/0203764 | A1 | 10/2004 | Hrastar et al. | |
| 2004/0252837 | A1 * | 12/2004 | Harvey et al. | 713/153 |

FOREIGN PATENT DOCUMENTS

| | | | |
|---|---|---|---|
| WO | WO 2004/019559 | A2 | 3/2004 |
| WO | WO 2004/019559 | A3 | 3/2004 |
| WO | WO 2004/028121 | A2 | 4/2004 |
| WO | WO 2004/059912 | A1 | 7/2004 |

OTHER PUBLICATIONS

Clouqueur et al. Sensor deployment strategy for detection of targets traversing a region, Mobile Networks and Applications vol. 8, Issue 4 (Aug. 2003) pp.: 453-461 Year of Publication: 2003.

Gana ett al., Infrastructure-based location estimation in WLAN Networks, Winlab Rutgers University, 2004.

Hatami et al., In-building intruder detection for WLAN access; Center for Wireless Inf. Network Studies, Worcester Polytech. Inst., MA, USA This paper appears in: Position Location and Navigation Symposium, 2004. PLANS 2004 Publication Date: Apr. 26-29, 2004, On page(s): 592-597.

Korba, Security system for wireless local area networks; Nat. Res. Council of Canada, Ottawa, Ont., Canada; This paper appears in: Personal, Indoor and Mobile Radio Communications, 1998. The Ninth IEEE International Symposium on Meeting Date: Sep. 8, 1998-Sep. 11, 1998 Publication Date: Sep. 8-11, 1998 Location: Boston, MA USA On page(s): 1550-1554, vol. 3.

Zhang et al., Intrusion detection techniques for mobile wireless networks, Wireless Networks vol. 9, Issue 5 (Sep. 2003) pp.: 545-556 Year of Publication: 2003.

Bellardo et al., Denial-of-Service Attacks: Real Vulnerabilities and Practical Solutions, Department of Computer and Science Engineering, University of California at San Diego, Proceedings of the USENIX Security Symposium, Washington, DC, Aug. 2003.

Lim et al., Wireless Intrusion Detection and Response, IEEE., Proceedings of the 2003 IEEE Workshop on Information Assurance United States Military Academy, West Point, NY, Jun. 2003.

* cited by examiner

320

600

1100

1320

1400

1500

METHOD AND SYSTEM FOR MONITORING A SELECTED REGION OF AN AIRSPACE ASSOCIATED WITH LOCAL AREA NETWORKS OF COMPUTING DEVICES

CROSS-REFERENCES TO RELATED APPLICATIONS

This present application claims priority to the following eight U.S. provisional applications, commonly assigned, and hereby incorporated by reference herein.

1. U.S. Provisional Application No. 60/527,673, titled "A system and a method for using of RF prediction data for securing wireless networks", filed on Dec. 8, 2003;

2. U.S. Provisional Application No. 60/569,024, titled "A zero-configuration method and a distributed sensor based system for accurate location tracking in wireless networks", filed on May 7, 2004;

3. U.S. Provisional Application No. 60/607,897, titled "Automated method and system for detecting unauthorized devices in wireless local area computer networks", filed on Sep. 8, 2004;

4. U.S. Provisional Application No. 60/607,812, titled "Method and system for detecting masquerading wireless devices in local area computer networks", filed on Sep. 8, 2004;

5. U.S. Provisional Application No. 60/610,419, titled "Method and system for preventing unauthorized connection of wireless access devices to local area computer networks", filed on Sep. 16, 2004;

6. U.S. Provisional Application No. 60/610,417, titled "Wireless network security exposure visualization and scenario analysis", filed on Sep. 16, 2004;

7. U.S. Provisional Application No. 60/543,631, titled "An Automated Method and an RF Sensor System for Wireless Unauthorized Transmission, Intrusion Detection and Prevention", filed on Feb. 11, 2004; and 8. U.S. Provisional Application No. 60/560,034, titled "A Method And A System For Reliably Regulating, Disrupting And Preventing Access To The Wireless Medium Through Distributed Passive And Active Wireless Sensors", filed Apr. 6, 2004.

The present invention also relates to U.S. application Ser. No. 10/931,585, filed on Aug. 31, 2004 and U.S. application Ser. No. 10/931,926, filed on Aug. 31, 2004, commonly assigned, and each of which is hereby incorporated by reference for all purposes, each of which claims priority to U.S. Provisional Application No. 60/543,631, titled "An Automated Method and an RF Sensor System for Wireless Unauthorized Transmission, Intrusion Detection and Prevention," filed Feb. 11, 2004, commonly assigned, and hereby incorporated by reference for all purposes. The present invention further relates to U.S. application Ser. No. 10/931,499, filed on Aug. 31, 2004, commonly assigned, and hereby incorporated by reference for all purposes, which claims priority to U.S. Provisional Application No. 60/560,034, titled "A Method and a System for Reliably Regulating, Disrupting and Preventing Access to Wireless Medium Through Distributed Passive and Active Wireless Sniffers," filed on Apr. 6, 2004, commonly assigned, and hereby incorporated by reference for all purposes.

BACKGROUND OF THE INVENTION

The present invention relates generally to wireless computer networking techniques. More particularly, the invention provides methods and systems for intrusion detection for local area networks with wireless extensions. The present intrusion detection can be applied to many computer networking environments, e.g. environments based upon the IEEE 802.11 family of standards (WiFi), Ultra Wide Band (UWB), IEEE 802.16 (WiMAX), Bluetooth, and others.

Computer systems have proliferated from academic and specialized science applications to day-to-day business, commerce, information distribution and home applications. Such systems can include personal computers (PCs) to large mainframe and server class computers. Powerful mainframe and server class computers run specialized applications for banks, small and large companies, e-commerce vendors, and governments. Personal computers can be found in many offices, homes, and even local coffee shops.

The computer systems located within a specific local geographic area (e.g. an office, building floor, building, home, or any other defined geographic region (indoor and/or outdoor)) are typically interconnected using a Local Area Network (LAN)(e.g. the Ethernet). The LANs, in turn, can be interconnected with each other using a Wide Area Network (WAN)(e.g. the Internet). A conventional LAN can be deployed using an Ethernet-based infrastructure comprising cables, hubs switches, and other elements.

Connection ports (e.g. Ethernet ports) can be used to couple multiple computer systems to the LAN. For example, a user can connect to the LAN by physically attaching a computing device (e.g. a laptop, desktop, or handheld computer) to one of the connection ports using physical wires or cables. Other types of computer systems, such as database computers, server computers, routers, and Internet gateways, can be connected to the LAN in a similar manner. Once physically connected to the LAN, a variety of services can be accessed (e.g. file transfer, remote login, email, WWW, database access, and voice over IP).

Using recent (and increasingly popular) wireless technologies, users can now be wirelessly connected to the computer network. Thus, wireless communication can provide wireless access to a LAN in the office, home, public hot-spot, and other geographical locations. The IEEE 802.11 family of standards (WiFi) is a common standard for such wireless communication. In WiFi, the 802.11b standard provides for wireless connectivity at speeds up to 11 Mbps in the 2.4 GHz radio frequency spectrum; the 802.11g standard provides for even faster connectivity at about 54 Mbps in the 2.4 GHz radio frequency spectrum; and the 802.11a standard provides for wireless connectivity at speeds up to 54 Mbps in the 5 GHz radio frequency spectrum.

Advantageously, WiFi can facilitate a quick and effective way of providing a wireless extension to an existing LAN. To provide this wireless extension, one or more WiFi access points (APs) can connect to the connection ports either directly or through intermediate equipment, such as WiFi switch. After an AP is connected to a connection port, a user can access the LAN using a device (called a station) equipped with WiFi radio. The station can wirelessly communicate with the AP.

In the past, security of the computer network has focused on controlling access to the physical space where the LAN connection ports are located. The application of wireless communication to computer networking can introduce additional security exposure. Specifically, the radio waves that are integral to wireless communication often cannot be contained in the physical space bounded by physical structures, such as the walls of a building.

Hence, wireless signals often "spill" outside the area of interest. Because of this spillage, unauthorized users, who could be using their stations in a nearby street, parking lot, or building, could wirelessly connect to the AP and thus gain access to the LAN. Consequently, providing conventional security by controlling physical access to the connection ports of the LAN would be inadequate.

To prevent unauthorized access to the LAN over WiFi, the AP can employ certain techniques. For example, in accordance with 802.11, a user is currently requested to carry out an authentication handshake with the AP (or a WiFi switch that resides between the AP and the existing LAN) before being able to connect to the LAN. Examples of such handshake are Wireless Equivalent Privacy (WEP) based shared key authentication, 802.1x based port access control, and 802.11i based authentication. The AP can provide additional security measures such as encryption and firewalls.

Despite these measures, security risks still exist. For example, an unauthorized AP may connect to the LAN and then, in turn, allow unauthorized users to connect to the LAN. These unauthorized users can thereby access proprietary/trade secret information on computer systems connected to the LAN without the knowledge of the owner of the LAN. Notably, even if the owner of the LAN enforces no WiFi policy (i.e. no wireless extension of the LAN allowed at all), the threat of unauthorized APs still exists.

Notably, an unauthorized AP can easily masquerade as an authorized AP. That is, an unauthorized AP can advertise the same feature set (e.g. MAC address and other settings) as an authorized AP (a type of attack called "MAC spoofing"), thereby making its detection difficult. Further, an unauthorized AP may also lure authorized clients to connect to it, thereby creating another level of legitimacy to further elude detection. Moreover, even if an unauthorized AP is not LAN-connected, it may still pose a security threat. Specifically, authorized clients in communication with the unauthorized AP may be unwittingly providing proprietary/trade secret information to the unauthorized AP. Therefore, a need arises for a system and technique that improves security for LAN environments.

From the above, techniques for improving security in wireless networks are highly desired.

BRIEF SUMMARY OF THE INVENTION

According to the present invention, techniques related to wireless computer networking are provided. More particularly, the invention provides methods and systems for intrusion detection for local area networks with wireless extensions. The present intrusion detection can be applied to many computer networking environments, e.g. environments based upon the IEEE 802.11 family of standards (WiFi), Ultra Wide Band (UWB), IEEE 802.16 (WiMAX), Bluetooth, and others.

The application of wireless communication to computer networking has introduced significant security risks. For example, the radio waves that are integral to wireless communication can "spill" outside a region within which local area computer network is operated (e.g. office space, building etc.). Unfortunately, unauthorized wireless devices can detect this "spillage". Additionally, unauthorized wireless devices can surreptitiously operate within the local area network. These devices can pose serious security threats to the network due to their signal spillage. Therefore, as computer networks with wireless extensions become more ubiquitous, users are increasingly concerned about unauthorized wireless devices, whether within or outside the region of operation of the local area network.

In accordance with one aspect of the invention, methods and security monitoring systems for wireless computer networking are provided. These methods and security monitoring systems can monitor wireless activity within and in the vicinity of the region of local area network operation. They can advantageously detect unauthorized wireless activity and alert the owner of the network about it. Additionally, they can restrict unauthorized wireless devices from accessing the local area network. Notably, these techniques and security monitoring systems can be applied to many computer networking environments, e.g. environments based upon the IEEE 802.11 family of standards (WiFi), UWB, WiMAX (802.16), Bluetooth, and others.

A method for monitoring a selected region of an airspace associated with local area networks of computing devices is provided. In this method, one or more segments of a legacy local area network to be protected are provided in a selected geographic region. In a specific embodiment, the selected geographic region can comprise office floor, apartment, building, commercial space, hot-spot, outdoor region, and the like. For securing this unsecured airspace, the method includes determining a security policy associated with the one or more segments of the legacy local area network. The security policy can at least characterize a type of wireless activity in the unsecured airspace to be permitted, denied, or ignored. Preferably, the security policy is directed to protect the one or more segments of the legacy local area network from unauthorized wireless access.

The one or more sniffer devices (e.g., signal detection devices) can be connected into the legacy local area network. These sniffer devices are spatially disposed within the selected geographic region to cause at least a portion of the unsecured airspace to be secured according to the security policy. The method also includes coupling a security appliance to the legacy local area network. The security appliance can communicate with the one or more sniffer devices over one or more computer networks. The method includes determining if at least one of the sniffer devices is coupled to each of the one or more segments of the legacy local area network to be protected, i.e., if the signals can be transferred by at least one sniffer to each of the one or more segments. In one specific embodiment, at least one sniffer is directly connected (e.g. via Ethernet port) to each of the segments of the legacy local area network to be protected. Moreover, the method can determine if the one or more sniffer devices substantially covers the portion of the unsecured airspace to be secured, i.e., based at least on locations and radio coverage of the sniffers. The computation of sniffer radio coverage can be using a computer model of the selected geographic region.

The method also comprises monitoring wireless activity in the airspace using the one or more sniffer devices. In one embodiment, the sniffers can capture, process and decode the wireless activity. In another embodiment, the sniffers can communicate wireless activity information to the security appliance. The security appliance can further process and store the information. Additionally, the method includes automatically classifying, using a classification process, a portion of information associated with the monitoring of the wireless activity to at least determine if the wireless activity communicates to at least one of the one or more segments to be protected.

The method can detect a violation of the security policy based upon at least the classifying of the portion of the information from the monitoring of the wireless activity. In a specific embodiment, the violation is associated with an occurrence of a to be denied wireless activity in the airspace.

The method also includes automatically processing an action associated with the violation in accordance to the security policy for the one or more segments in the legacy local area network to be protected. In one embodiment, the action can include raising and logging an alert. In an alternative embodiment, the action can include sending indication to a prevention process.

Notably, the method can further provide an indication associated with the violation of the wireless security policy on a user interface of a display (e.g. coupled to the security appliance). In one embodiment, the indication comprises prediction of physical location of the source of wireless activity (e.g., location of intruder device) causing the policy violation in relation to the spatial layout of the selected geographic region.

Certain advantages and/or benefits may be achieved using the present invention. For example, the present technique provides an easy to use process that relies upon conventional computer hardware and software technologies. In some embodiments, the method and system are fully automated and can be used to prevent unauthorized wireless access to local area computer networks. The automated operation minimizes the human effort required during the system operation and improves the system response time and accuracy. In some embodiments, the method and system can advantageously reduce the false positives on intrusion events thereby eliminating the nuisance factor during the system operation. This is because the technique of the invention intelligently distinguishes between harmful APs and friendly neighbor's APs, the latter usually being the source of false positives.

The present technique advantageously provides for visualization of RF coverage characteristics associated with the components of the wireless network. Visualization of sniffer coverage can facilitate providing comprehensive security cover for the unsecured airspace. Additionally, the radio coverage computation according to an aspect of the present invention can account for characteristics of the spatial layout of the selected geographic region, and prediction uncertainties and signal variability intrinsic to radio signal propagation thereby making the coverage computation realistic. The method can advantageously provide visual indication of the sniffers' coverage in graphical form in relation to the layout of the selected region. Additionally, the method can provide visual indication of radio coverage of authorized wireless devices in relation to the layout of the geographic area. This facilitates easy to comprehend security exposure analysis of the local area network.

In one embodiment, the method provides for selective and reliable suppression of transmission from the unauthorized wireless devices associated with the to be denied wireless activity. Depending upon the embodiment, one or more of these benefits may be achieved. These and other benefits will be described in more throughout the present specification and more particularly below.

DETAILED DESCRIPTION OF THE INVENTION

According to the present invention, techniques related to wireless computer networking are provided. More particularly, the invention provides methods and systems for intrusion detection for local area networks with wireless extensions. The present intrusion detection can be applied to many computer networking environments, e.g. environments based upon the IEEE 802.11 family of standards (WiFi), Ultra Wide Band (UWB), IEEE 802.16 (WiMAX), Bluetooth, and others.

Conventional security of a computer network has focused on controlling access to the physical space where the local area network (LAN) connection ports are located. The application of wireless communication to computer networking has introduced new security risks. Specifically, the radio waves that are integral to wireless communication often cannot be contained within the physical boundaries of the region of operation of a local area network (e.g. an office space or a building). This "spillage" can be detected by unauthorized wireless devices outside the region of operation. Additionally, unauthorized wireless devices can be operating within the local area network, and can even be connected to the local area network. The radio coverage of such devices that spills outside the region of operation can be used by devices outside the region to gain unauthorized access to the local area network. As computer networks with wireless extensions become more ubiquitous, users are increasingly concerned about unauthorized wireless devices, whether within or outside the region of operation of the local area network.

Figure 1:
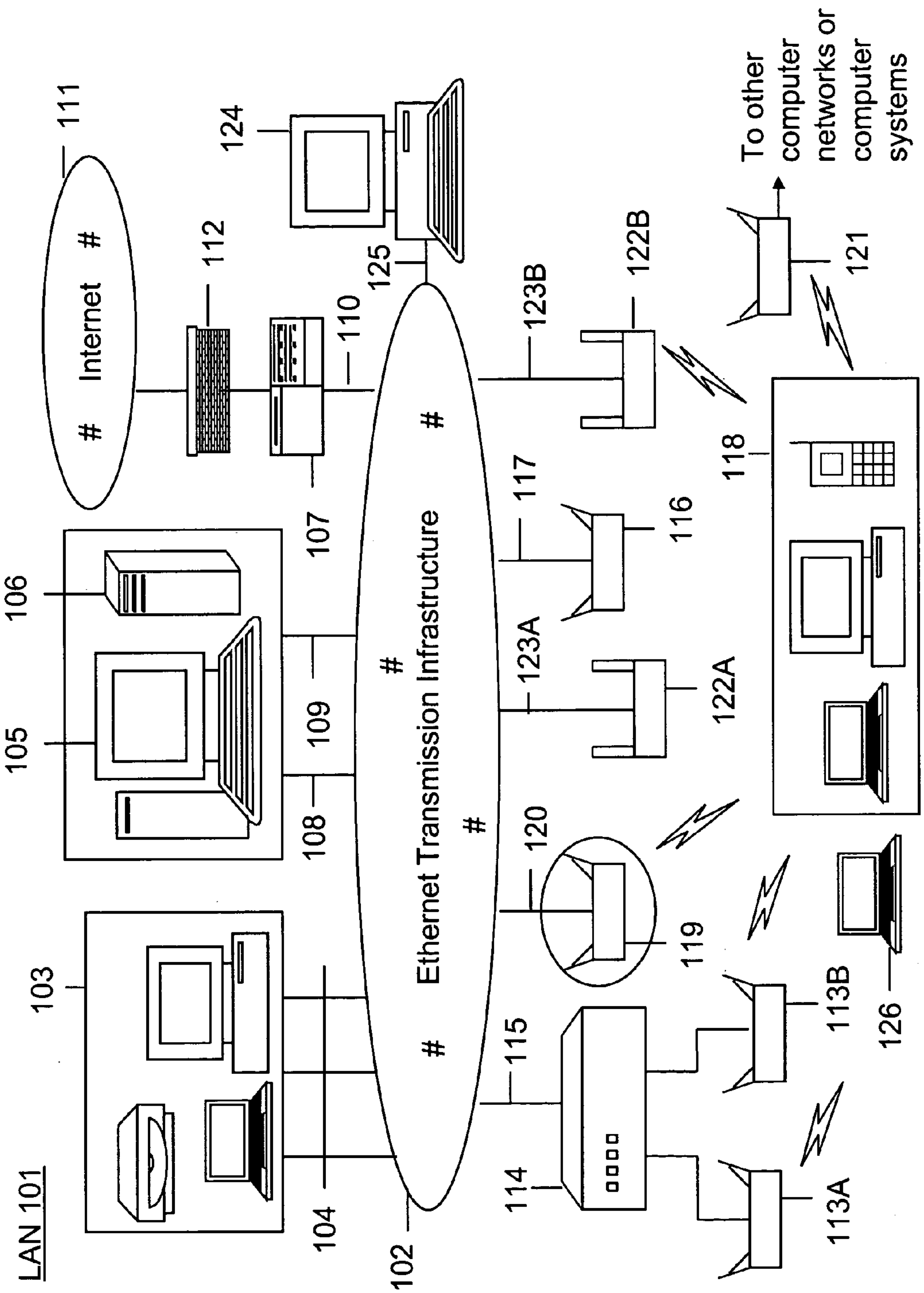
FIG. 1 illustrates a simplified LAN architecture that can facilitate monitoring of unsecured airspace according to an embodiment of the present invention.

FIG. 1 illustrates a simplified local area network (LAN) 101 that can facilitate security monitoring. This diagram is merely an example, which should not unduly limit the scope of the claims herein. One of ordinary skill in the art would recognize many variations, modifications, and alternatives. In LAN 101, a core transmission infrastructure 102 can include various transmission components, e.g. Ethernet cables, hubs, and switches. In a typical deployment, the core transmission infrastructure 102 comprises one or more network segments.

According to one embodiment, a network segment refers to an IP "subnetwork" (called "subnet"). Each subnet is identified by a network number (e.g. IP number and subnet mask) and plurality of subnets are interconnected using router devices. Notably, the plurality of subnets of the LAN 101 can be geographically distributed (e.g. in offices of a company in different geographic locations). The geographically distributed segments are interconnected via virtual private network (VPN).

One or more connection ports (e.g. Ethernet sockets) are provided on each of the segments for connecting various computer systems to the LAN 101. Thus, one or more end user devices 103 (such as desktop computers, notebook computers, telemetry sensors etc.) can be connected to LAN 101 via one or more connection ports 104 using wires (e.g. Ethernet cables) or other suitable connection means.

Other computer systems that provide specific functionalities and services can also be connected to LAN 101. For example, one or more database computers 105 (e.g. computers storing customer accounts, inventory, employee accounts, financial information, etc.) may be connected to LAN 101 via one or more connection ports 108. Additionally, one or more server computers 106 (computers providing services, such as database access, email storage, HTTP proxy service, DHCP service, SIP service, authentication, network management etc.) may be connected to LAN 101 via one or more connection ports 109.

In this embodiment, a router 107 can be connected to LAN 101 via a connection port 110. Router 107 can act as a gateway between LAN 101 and the Internet 111. Note that a firewall/VPN gateway 112 can be used to connect router 107 to the Internet 111, thereby protecting computer systems in LAN 101 against hacking attacks from the Internet 111 as well as enabling remote secure access to LAN 101.

In this embodiment, a wireless extension of LAN 101 is also provided. For example, authorized APs 113A and 113B can be connected to LAN 101 via a switch 114. Switch 114 in turn can be connected to a connection port 115. Switch 114 can assist APs 113A and 113B in performing certain complex procedures (e.g. procedures for authentication, encryption, QoS, mobility, firewall etc.) as well as provide centralized management functionality for APs 113A and 113B. Note that an authorized AP 116 can also be directly connected to LAN 101 via a connection port 117. In this case, AP 116 may perform necessary security procedures (such as authentication, encryption, firewall, etc.) itself.

In this configuration, one or more end user devices 118 (such as desktop computers, laptop computers, handheld computers, PDAs, etc.) equipped with radio communication capability can wirelessly connect to LAN 101 via authorized APs 113A, 113B, and 116. Notably, authorized APs connected to the LAN 101 provide wireless connection points on the LAN. Note that WiFi or another type of wireless network format (e.g. UWB, WiMax, Bluetooth, etc.) can be used to provide the wireless protocols.

As shown in FIG. 1, an unauthorized AP 119 can also be connected to LAN 101 using a connection port 120. Unauthorized AP 119 could be a malicious AP, a misconfigured AP, or a soft AP. A malicious AP refers to an AP operated by a person having physical access to the facility and connected to LAN 101 without the permission of a network administrator. A misconfigured AP refers to an AP allowable by the network administrator, but whose configuration parameters are, usually inadvertently, incorrectly configured. Note that an incorrect configuration can allow intruders to wirelessly connect to the misconfigured AP (and thus to LAN 101). A soft AP typically refers to a WiFi-enabled computer system connected to a connection port, but also functioning as an AP under the control of software. The software can be either deliberately run on the computer system or inadvertently run in the form of a virus program. Notably, the unauthorized APs create unauthorized wireless connection points on the LAN.

Unauthorized AP 119 may pose any number of security risks. For example, unauthorized AP 119 may not employ the right security policies or may bypass security policy enforcing elements, e.g. switch 114. Moreover, an intruder, such as unauthorized station 126 can connect to LAN 101 and launch attacks through unauthorized AP 119 (e.g. using the radio signal spillage of unauthorized AP outside the defined geographic region). In one embodiment, unauthorized AP 119 may perform MAC spoofing, thereby making its detection difficult.

Notably, an AP delivers data packets between the wired LAN segment and the wireless medium. Depending upon the embodiment, the AP can perform this function by acting as a layer 2 bridge or as a NAT (i.e., network address translator)/router. The layer 2 bridge type AP simply transmits the Ethernet packet received on its wired interface to the wireless link after translating it to 802.11 style packet and vice versa. The NAT/router AP on the other hand acts as a layer 3 (IP) router that routes IP packets received on its wired interface to the stations connected to its wireless interface and vice versa. The wired side and wireless side interfaces of the NAT/router AP thus usually part of different subnets. The NAT AP further performs translation of IP addresses and port numbers in the packets before transferring them between the wired LAN segment and the wireless medium.

FIG. 1 also shows another unauthorized AP 121 whose radio coverage spills into the region of operation the concerned LAN. According to a specific embodiment, the AP 121 can be an AP in the neighboring office that is connected or unconnected to the neighbor's LAN, an AP on the premises of LAN 101 that is not connected to the LAN 101 and other APs, which co-exist with the LAN and share the airspace without any significant and/or harmful interferences. According to another specific embodiment, the AP 121 can be hostile AP. Notably, even though not connected to LAN 101, unauthorized AP 121 may lure authorized stations into communicating with it, thereby compromising their security. The hostile AP may lure authorized wireless stations into connecting to it and launch man-in-the-middle, denial of service, MAC spoofing and other kinds of disruptive attacks.

In accordance with one aspect of the invention, a security monitoring system can protect LAN 101 from any type of unauthorized user (i.e., unauthorized AP or unauthorized station). The intrusion detection system can include one or more RF sensor/detection devices (e.g. sensor devices 122A and 122B, each generically referenced herein as a sniffer 122) disposed within or in a vicinity of a selected geographic region comprising LAN 101. In one embodiment (shown in FIG. 1), sniffer 122 can be connected to LAN 101 via a connection port (e.g. connection port 123A/123B). In another embodiment, sniffer 122 can be connected to LAN 101 using a wireless connection.

A sniffer 122 is able to monitor wireless activity in a subset of the selected geographic region. Wireless activity can include any transmission of control, management, or data packets between an AP and one or more wireless stations, or among one or more wireless stations. Wireless activity can even include communication for establishing a wireless connection between an AP and a wireless station (called "association").

In general, sniffer 122 can listen to a radio channel and capture transmissions on that channel. In one embodiment, sniffer 122 can cycle through multiple radio channels on which wireless communication could take place. On each radio channel, sniffer 122 can wait and listen for any ongoing transmission. In one embodiment, sniffer 122 can operate on multiple radio channels simultaneously.

Whenever a transmission is detected, sniffer 122 can collect and record the relevant information about that transmission. This information can include all or a subset of information gathered from various fields in a captured packet, such as an 802.11 MAC (medium access control) header, an 802.2 LLC (logical link control) header, an IP header, transport protocol (e.g. TCP, UDP, HTTP, RTP etc.) headers, packet size, packet payload, and other fields. In one embodiment, the MAC addresses of the transmitter and the receiver of the packet can be recorded. In another embodiment, other information available in the MAC header can also be recorded, such as the packet type, beacon parameters, security settings, SSID, and BSSID. In yet another embodiment, a receive signal strength indicator (RSSI) associated with the captured packet can also be recorded. Other information such as the day and the time the transmission was detected can also be recorded.

Figure 17:
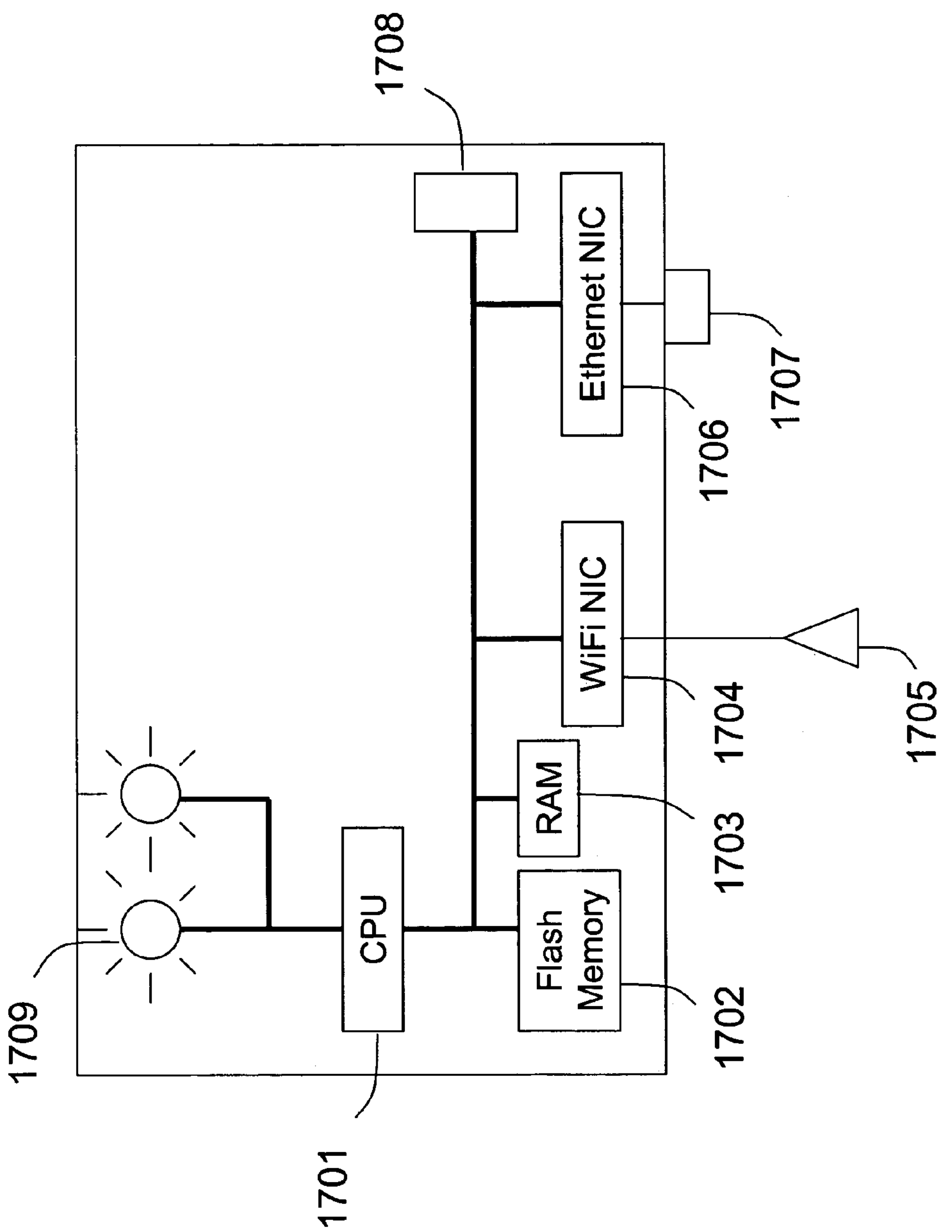
FIG. 17 illustrates exemplary sniffer device architecture according to an embodiment of the present invention.

In one embodiment, sniffer 122 can be any suitable receiving device capable of detecting wireless activity. An exemplary hardware diagram of the sniffer is shown in FIG. 17. This diagram is merely an example, which should not unduly limit the scope of the claims herein. One of ordinary skill in the art would recognize many variations, alternatives, and modifications. As shown, in order to provide the desired detection and recording functionality, sniffer 122 can have a processor 1701, a flash memory 1702 where the software code for sniffer functionality resides, a RAM 1703 which serves as volatile memory during program execution, one or more 802.11a/b/g wireless network interface cards (NICs) 1704 which perform radio and wireless MAC layer functionality, one or more (i.e., for radio diversity) of dual-band (i.e., for transmission detection in both the 2.4 GHz and 5 GHz radio frequency spectrums) antennas 1705 coupled to the wireless NICs, an Ethernet NIC 1706 which performs Ethernet physical and MAC layer functions, an Ethernet jack 1707 such as RJ-45 socket coupled to the Ethernet NIC for connecting the sniffer device to wired LAN with optional power over Ethernet or POE, a serial port 1708 which can be used to flash/configure/troubleshoot the sniffer device, and a power input. One or more light emitting diodes (LEDs) 1709 can be provided on the sniffer device to convey visual indications (such as device working properly, error condition, unauthorized wireless activity alert, and so on).

In one embodiment, sniffer 122 can be built using a hardware platform similar to that used to build an AP, although having different functionality and software. In one embodiment, to more unobtrusively be incorporated in the defined geographic region, sniffer 122 could have a small form factor. In one embodiment, a sniffer 122 could also be provided with radio transmit interface, thereby allowing sniffer 122 to generate interference with a suspected intruder's transmission. The radio transmit interface could also be used by the sniffer 122 for active probing which involves transmission of test signals.

A sniffer 122 can be spatially disposed at an appropriate location in the selected geographic region by using heuristics, strategy, and/or calculated guesses. In accordance with one aspect of the invention, an RF (radio frequency) planning tool can be used to determine an optimal deployment location for sniffer 122.

Server 124 (also called "security appliance") can be coupled to LAN 101 using a connection port 125. In one embodiment, each sniffer 122 can convey its information about detected wireless activity to server 124 (i.e., over one or more computer networks). Server 124 can then analyze that information, store the results of that analysis, and process the results. In another embodiment, sniffer 122 may filter and/or summarize its information before conveying it to server 124.

Sniffer 122 can also advantageously receive configuration information from server 124. This configuration information can include, for example, the operating system software code, the operation parameters (e.g. frequency spectrum and radio channels to be scanned), the types of wireless activities to be detected, and the identity information associated with any authorized wireless device. Sniffer 122 may also receive specific instructions from server 124, e.g. tuning to specific radio channel or detecting transmission of specific packet on a radio channel.

Figure 2:
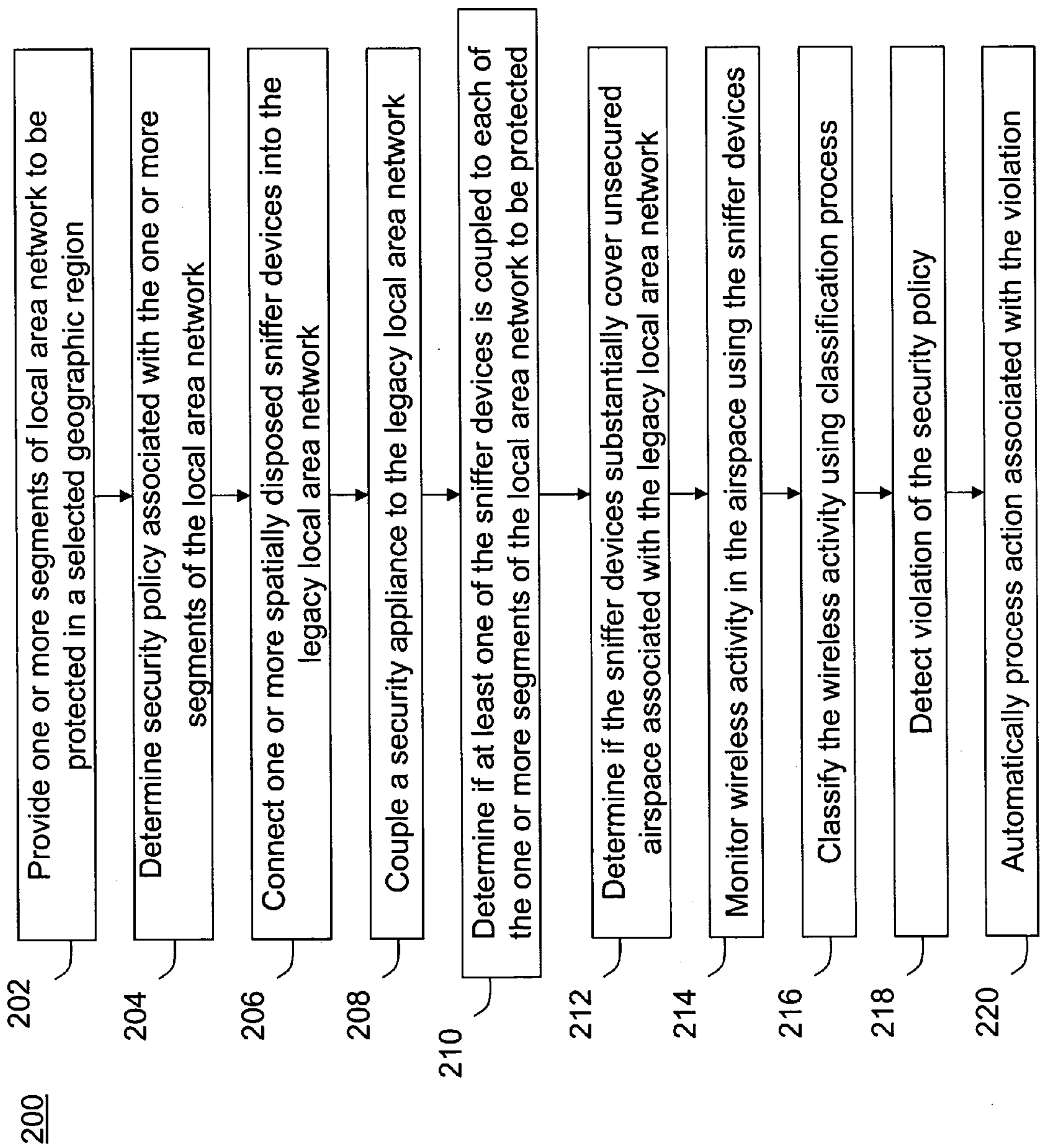
FIG. 2 illustrates a method for monitoring a selected region of an airspace associated with local area network of computing devices according to an embodiment of the present invention.

According to a specific embodiment, the present invention provides a method for monitoring a selected region of an airspace associated with local area networks of computing devices. For example, the selected region of an airspace is in the vicinity of one or more connection points (e.g. Ethernet ports, authorized APs etc.) of the local area network. As another example, the selected region of an airspace is in a vicinity of a portion of the selected geographic region comprising the local area network. Preferably the selected region of the airspace is susceptible to security attacks (e.g. intrusion, denial of service, man in the middle, MAC spoofing etc.) from unauthorized users. This method 200 is illustrated in FIG. 2. This diagram is merely an example, which should not unduly limit the scope of the claims herein. One of ordinary skill in the art would recognize many variations, modifications, and alternatives. The method can be implemented using sniffers 122 and appliance 124. The various steps in the method 200 are as follows. Of course, steps be added, removed, or interchanged.

As shown, step 202 can provide one or more segments of a legacy local area network to be protected in a selected geographic region. For example, the selected geographic region comprises office space, home, apartments, government buildings, warehouses, hot-spots, commercial facilities, outdoor regions, and so on. In a specific embodiment, the legacy local area network can comprise one or more computing devices having wireless transmitter/receiver. The legacy local area network can further comprise a trusted wired infrastructure (e.g. coupled to the Internet through conventional firewall). The legacy local area network is characterized by an unsecured airspace within the selected geographic region. That is, unauthorized wireless stations can launch security attacks on the local area network by transmitting/receiving wireless signals through this unsecured airspace.

Step 204 can determine a security policy associated with the one or more segments of the legacy local area network. Preferably, the security policy at least characterizes a type of wireless activity within the unsecured airspace to be permitted, denied, or ignored. Preferably, the security policy is directed to protect the legacy local area network from unauthorized wireless intruders. This security policy can be enforced by the security monitoring system.

Step 206 can connect one or more sniffer devices into the legacy local area network. The one or more sniffer devices are spatially disposed within the selected geographic region to cause at least a portion of the unsecured airspace to be secured. The sniffer devices can capture and analyze the wireless activity in the unsecured airspace.

Step 208 can couple a security appliance to the legacy local area network. In a specific embodiment, the sniffer devices and the security appliance communicate over one or more computer networks.

Step 210 can determine if at least one of the sniffer devices is coupled to each of the one or more segments of the legacy local area network to be protected. That is, at least one sniffer device can send test signals into the segment of the local area network to be protected directly or via one or more computer networks. In a specific embodiment, the sniffer can be connected to a selected LAN segment using Ethernet connection. In an alternative specific embodiment, the sniffer can communicate the identity of the network segment to which it is connected to the security appliance. The security appliance can display this identity of the user interface.

Step 212 can determine if the one or more sniffer devices substantially covers the portion of the unsecured airspace to be secured. Preferably this determining is based at least on a location and radio coverage of each of the one or more sniffer devices. This determination ensures that there are no holes in the sniffer coverage of the portion of the unsecured airspace to be secured. In a specific embodiment, the sniffer radio coverage can be computed using a computer model of the selected geographic region. In another specific embodiment, the computer model can include information (e.g. physical dimensions, material properties, locations etc.) associated with spatial layout components (e.g. walls, entrances, windows, obstacles, partitions, columns, patio, foliage, floor plan, etc.) of the selected geographic region.

Step 214 can monitor wireless activity in the airspace using the one or more sniffer devices.

Step 216 can automatically classify, using a classification process, a portion of information associated with the monitoring of the wireless activity. The classification process is directed to at least determining if the wireless activity communicates to at least one of the one or more segments to be protected. In one embodiment, the classification process can also determine if the wireless activity is authorized. In an alternative embodiment, the classification process can also determine if the wireless activity is associated with a wireless device that masquerades as authorized wireless device. In yet an alternative embodiment, the classification process can also determine if the wireless activity is directed to denial of service attack on the network. In yet a further alternative embodiment, the classification process can also determine if the parameters associated with the wireless activity (e.g. receive signal strength, source address, etc.) are consistent with the baseline. In one specific embodiment, the classification process can generate test signals. In another specific embodiment, the classification process may not generate test signals.

Step 218 can detect a violation of the security policy based upon at least the classifying of the portion of the information from the monitoring of the wireless activity. For example, the violation can refer to an occurrence of a to be denied wireless activity in the airspace.

Step 220 can automatically process an action associated with the violation in accordance to the security policy for the one or more segments of the legacy local area network to be protected. The action including, but not limited to, raising an alert, logging an alert, sending indication to prevention process, and restricting (e.g., electronically) one or more wireless devices associated with the violation of the security policy from wireless communication without detrimentally influencing any of the other wireless devices.

Figure 3A:
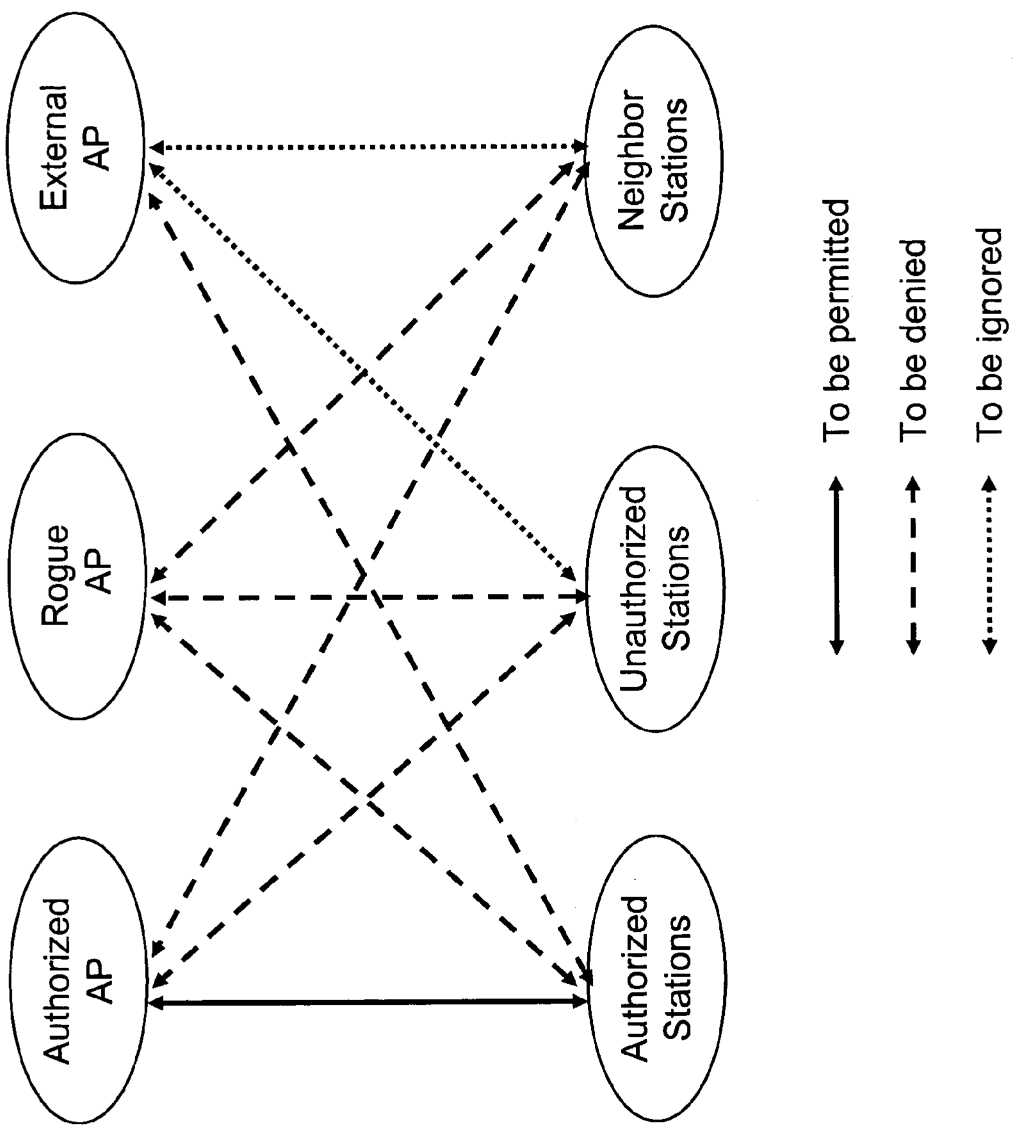
FIG. 3A illustrates an exemplary security policy characterizing wireless activity type as to be permitted, denied or ignored according to an embodiment of the present invention.

In a specific embodiment of the method of invention, the classification process includes classifying the APs into three categories: authorized, rogue and external. An "authorized AP" refers to the AP allowed by the network administrator (e.g. APs 113A, 113B and 116), a "rogue AP" refers to the AP not allowed by the network administrator, but still connected to the network segment to be protected (e.g. AP 119), and an "external AP" refers to the AP not allowed by the network administrator, but not connected to the network segment to be protected (e.g. AP 121). For example, the external AP can be neighbor's AP connected to neighbor's network, an AP connected to a different segment of the LAN, etc. In a specific embodiment, the network administrator can provide a detailed list of authorized wireless devices to the security monitoring system. In an alternative specific embodiment, the classification process can automatically identify authorized APs by active probing (described below). In yet an alternative specific embodiment, the classification process includes automatically detecting whether an AP is connected or unconnected to the network segment. A security policy can be enforced using the foregoing AP classification. For example, wireless communication between an authorized wireless station (e.g. stations 118) and the authorized AP is to be permitted, according to a security policy. The wireless communication between an unauthorized/neighbor's wireless station (e.g. station 126) and the external AP is to be ignored, according to a security policy. Advantageously, the ignoring eliminates false alarms associated with security policy violation and removes nuisance factor from the operation of the intrusion detection system. All other wireless communication (e.g. between an authorized/unauthorized/ neighbor's wireless station and the rogue AP, between an authorized wireless station and the external AP, etc.) is to be denied, according to a security policy. Advantageously, the denying prevents compromising the integrity of the network segment to be protected and the authorized wireless stations. The aforementioned security policy is illustrated in FIG. 3A. This diagram is merely an example, which should not unduly limit the scope of the claims herein. One of ordinary skill in the art would recognize many variations, modifications, and alternatives.

Figure 3B:
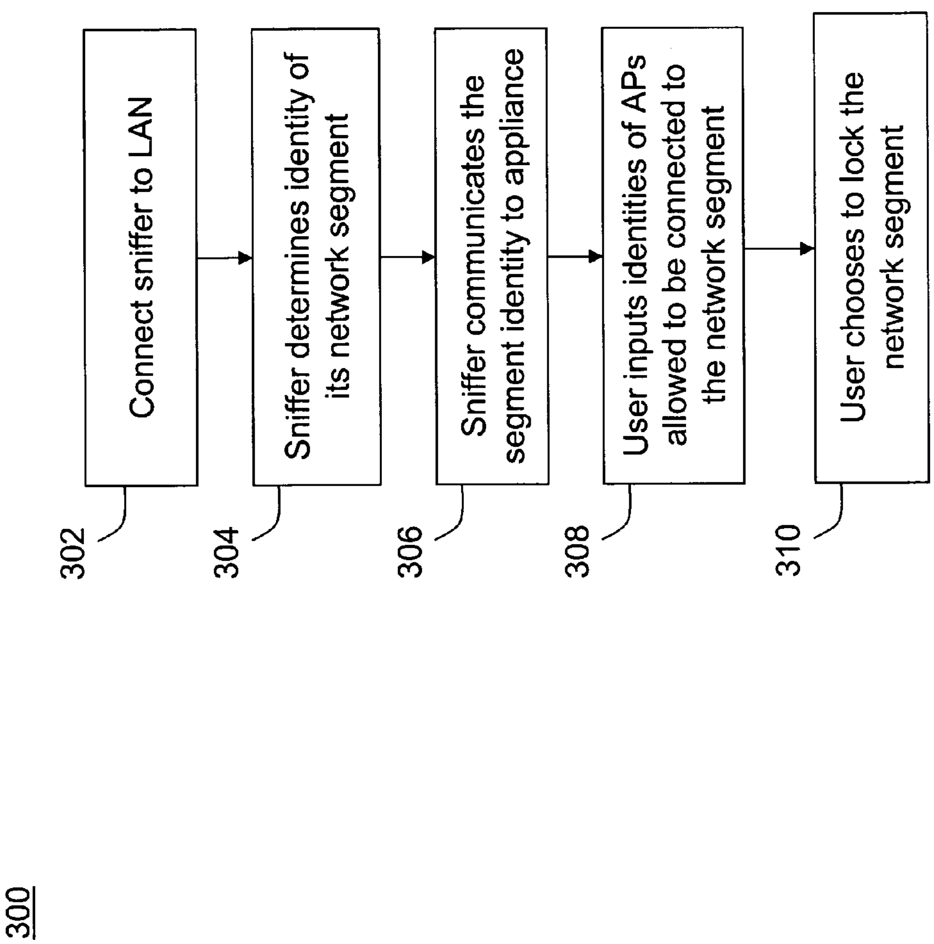
FIG. 3B illustrates a method to determine a security policy for a network segment, according to a specific embodiment of the present invention.

In an alternative embodiment, the classification process can determine if a selected AP is connected to a selected network segment. In this embodiment, the network administrator can specify the APs that are allowed to be connected to the selected network segment. Any other APs (authorized or unauthorized) connecting to said network segment are to be denied, according to a security policy. This can be referred as "network locking". Method 300 to facilitate the foregoing security policy is illustrated in FIG. 3B. This diagram is merely an example, which should not unduly limit the scope of the claims herein. The method 300 can be used for the steps 204, 216 and 218. One of ordinary skill in the art would recognize many variations, alternatives, and modifications. The steps in method 300 are as follows. Of course, steps can be added, removed, or interchanged.

At step 302, the sniffer is connected to the LAN. In a preferred embodiment, the connection is Ethernet connection. At step 304, the sniffer determines the identity of the network segment to which it is connected. In a specific embodiment, the sniffer obtains IP address for its Ethernet interface (i.e., the network interface that is connected to the network segment) via DHCP (Dynamic Host Configuration Protocol) request and response transactions. Via DHCP transactions, the sniffer learns about the identity of the network segment. In an alternative embodiment, the IP address of the sniffer is statically configured. The sniffer is able to extract the network segment identity information form this configuration. In a specific embodiment the identity is in the form of IP address and subnet mask such as, for example, 192.168.1.0/24, wherein 192.168.1.0 corresponds to IP address and 24 corresponds to subnet mask.

Figure 3C:
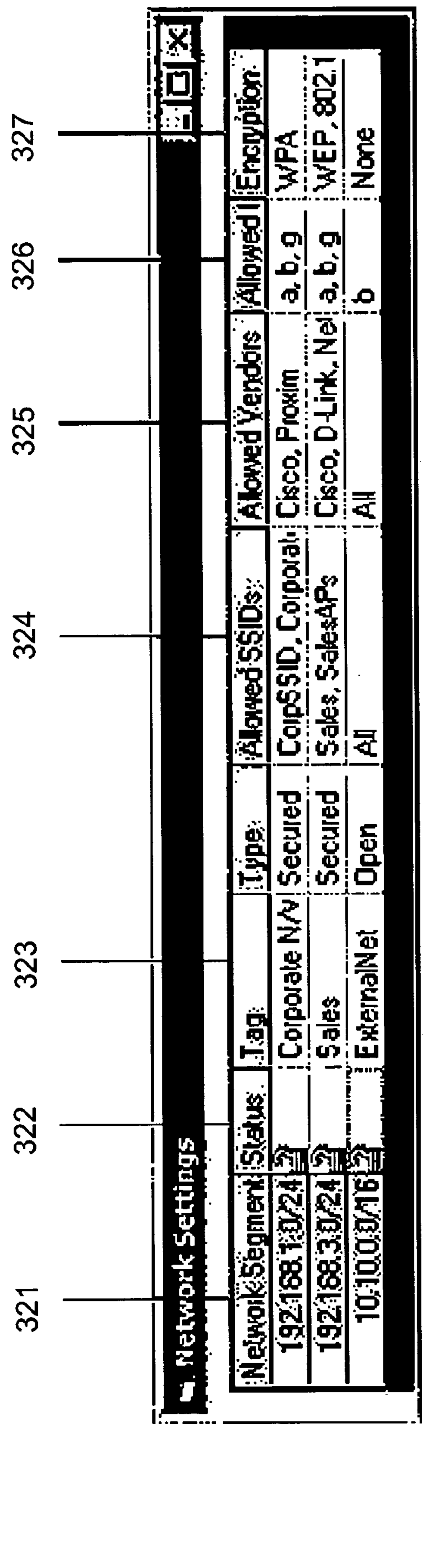
FIG. 3C illustrates a computer screenshot that facilitates determining a security policy for a network segment, according to another specific embodiment of the present invention.

At step 306, the sniffer communicates the identity information of the network segment to which it is connected to the security appliance. This identity is displayed on a user interface of a display device coupled to the security appliance. In a specific embodiment, if plurality of sniffers is connected to the same LAN segment, only one sniffer communicates the identity information of the network segment to the security appliance. The sniffer that communicates the identity information lets other sniffers know about its action by sending a broadcast packet over the wireless medium or over the Ethernet connection. The broadcast packet contains information for other sniffers to infer about the action of the sniffer that originates the broadcast packet. FIG. 3C shows an example of computer screen display 320 indicating LAN segment identities detected by the sniffers. This diagram is merely an example, which should not unduly limit the scope of the claims herein. One of ordinary skill in the art would recognize many variations, modifications, and alternatives. As shown, the LAN segment identities are shown in column 321. Column 322 shows if the corresponding LAN segment is currently locked or unlocked. In a specific embodiment an icon reminiscent of a lock is used to convey this information. Other embodiments such as text messages, buttons, and checkboxes are also possible. Column 323 shows the nickname given by the network administrator to the corresponding LAN segment. Columns 324–327 provide information associated with identities of APs/protocols that the network administrator has allowed to be connected to the LAN segment.

Figure 3D:
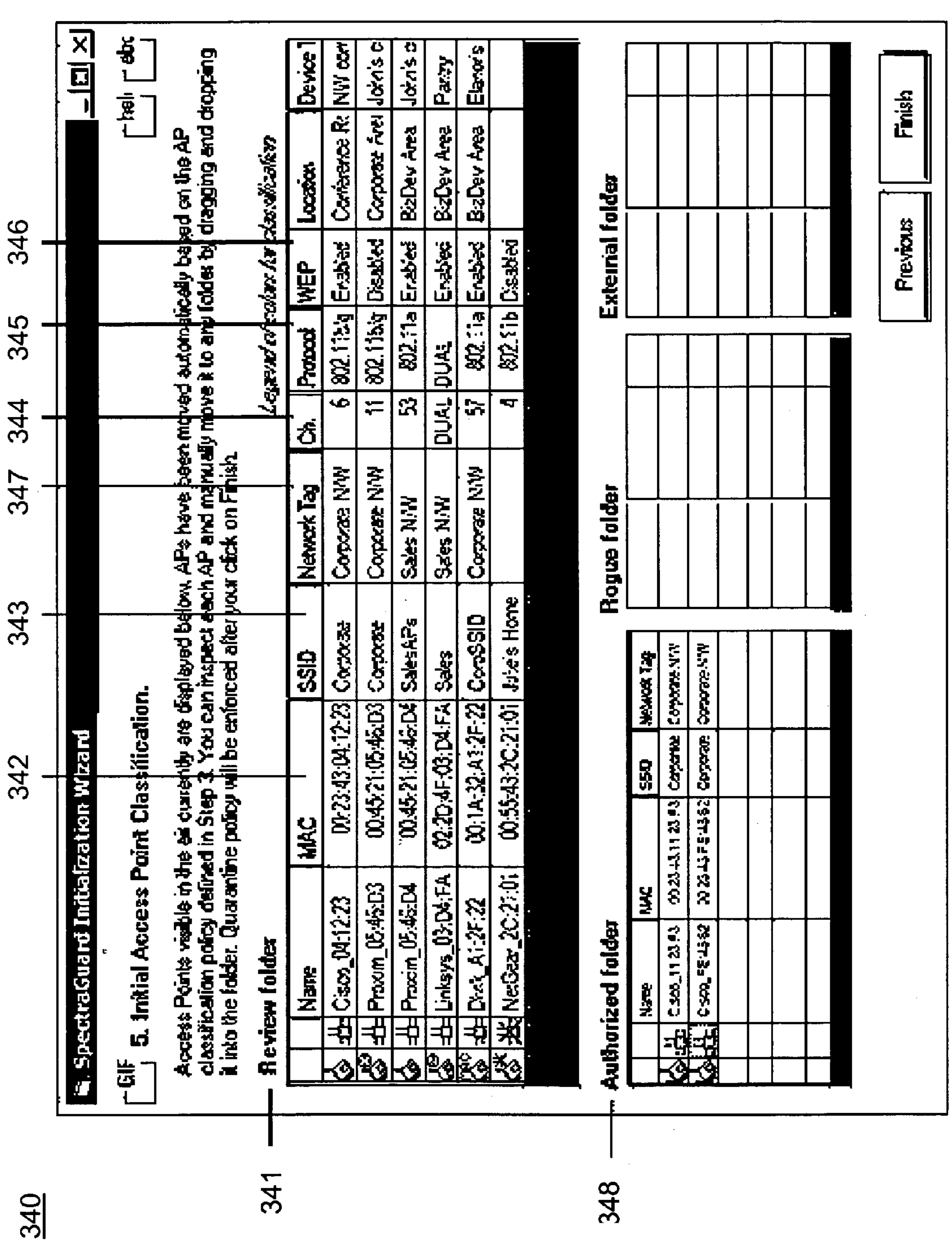
FIG. 3D illustrates another computer screenshot that facilitates determining a security policy for a network segment, according to yet another specific embodiment of the present invention.

At step 308, the user (i.e., network administrator) inputs identity information (e.g. MAC address, vendor information, protocol type, SSID etc.) of the APs that are allowed to be connected to a selected LAN segment. Note that the network administrator may not specify any such AP (i.e., indicating no wireless allowed at all). Alternatively, the network administrator may specify one or more APs. In one embodiment, the user may be presented with a list of APs that the sniffer is able to detect as active APs and the user is required to choose the APs among the list that are allowed to be connected to the selected LAN segment. In an alternative embodiment, the user is presented with a list of APs that the sniffer is able to detect as active and that are connected to the selected LAN segment. The user is required to choose the APs among the list that are allowed to be connected to the LAN segment. In yet an alternative embodiment, the user manually enters the identity information of APs that are allowed to be connected to the LAN segment, for example using input screen menu and computer keyboard. FIG. 3D shows an example of computer screen display 340 indicating the selection made by the user regarding identities (e.g. MAC addresses) of APs that are allowed to be connected to the LAN segment. This diagram is merely an example, which should not unduly limit the scope of the claims herein. One of ordinary skill in the art would recognize many variations, modifications, and alternatives. As shown, pane 341 shows list of active APs detected by sniffers. The column 342 shows MAC addresses of active APs as detected by sniffers. The columns 343-346 show other characteristics of APs detected by the sniffers. The column 347 shows the identity of the LAN segment to which corresponding AP is connected as detected by the sniffer. The user makes selection from the list presented in pane 341. In a specific embodiment, the user makes selection from the list by dragging an AP identity from the list to the authorized area 348.

After specifying the APs that can be connected to the selected LAN segment, at step 310 the user is required to specify if he/she would like to "lock" the LAN segment. Locking the network segment is equivalent to instructing the security monitoring system not to allow any AP to connect to the LAN segment, other than the ones specified by the user in the earlier step 308.

Figure 3E:
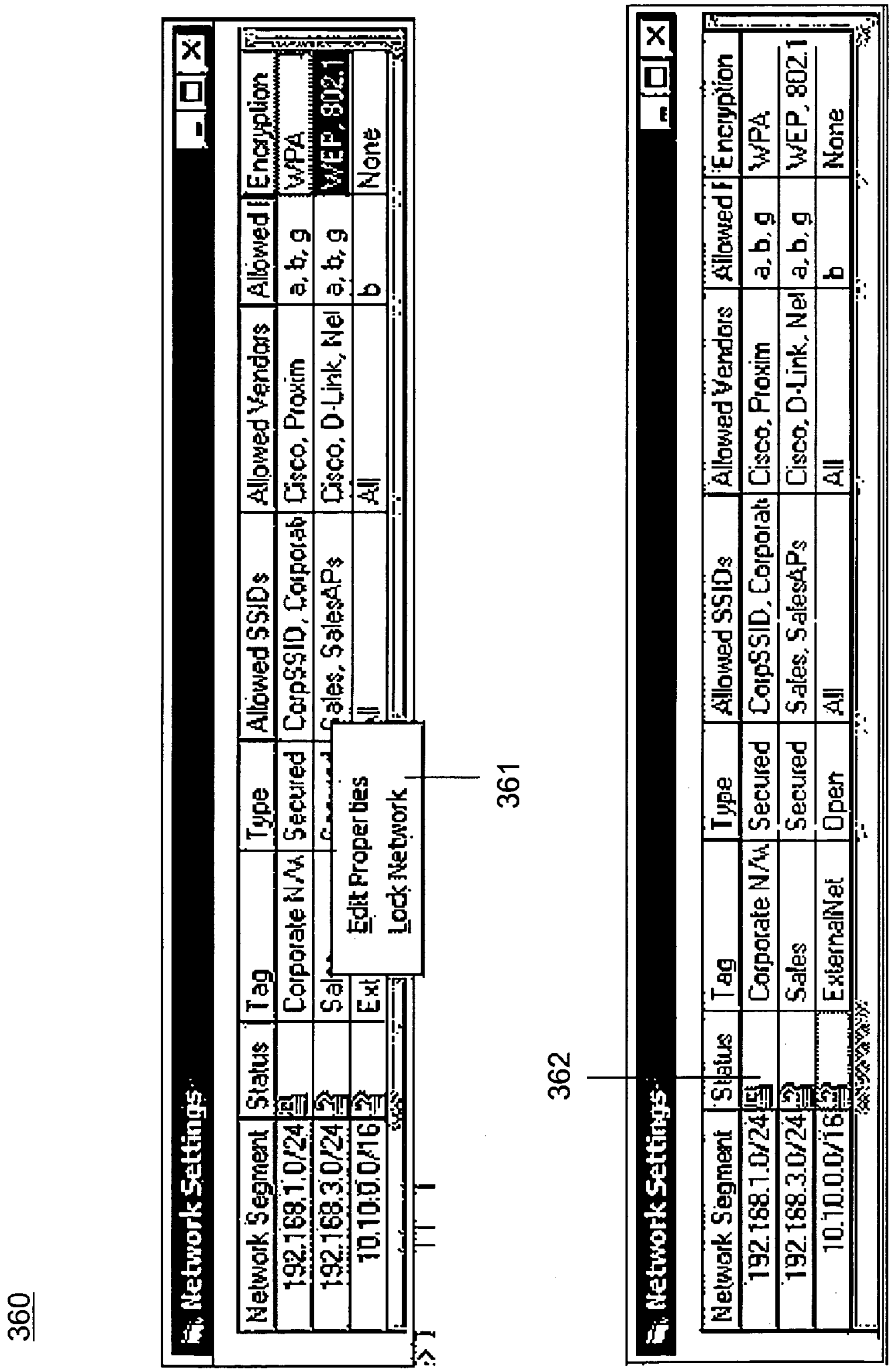
FIG. 3E illustrates yet another computer screenshot that facilitates determining a security policy for a network segment, according to a specific embodiment of the present invention.

FIG. 3E shows an example of computer screen display 360 indicating the network administrator's decision to lock the LAN segment. This diagram is merely an example, which should not unduly limit the scope of the claims herein. One of ordinary skill in the art would recognize many variations, modifications, and alternatives. As shown by icon 362 in FIG. 3E, the user has chosen to lock the LAN segment 192.168.1.0/24. In one specific embodiment, the user can click a computer mouse on the network number to open a menu box 361 and use the menu to communicate the decision to lock the network to the security monitoring system.

The security monitoring system detects and automatically classifies wireless activity in the airspace to detect any security policy violations. In a specific embodiment, an action is performed when the security violation is detected. For example, an occurrence of to be denied wireless activity can refer to security violation. For example, in one embodiment if a rouge AP is detected, security policy violation is inferred. In an alternative embodiment, if a client wireless station communicating with a rogue AP is detected, security policy violation is inferred. In yet an alternative embodiment, when an AP other than those specified by the network administrator is detected to be connected to a locked network segment, security policy violation is inferred. According to one embodiment, the action associated with the occurrence of the to be denied wireless activity (e.g. security violation) can be generating and logging an alert. As per another embodiment, the action can be restricting (e.g. electronically) the wireless devices associated with the to be denied wireless activity from engaging in any future wireless communication. In yet another embodiment, the physical location of the source of to be denied wireless activity is predicted and corresponding indication is displayed on a user interface of a display device in relation to the layout of the selected region.

Figure 4:
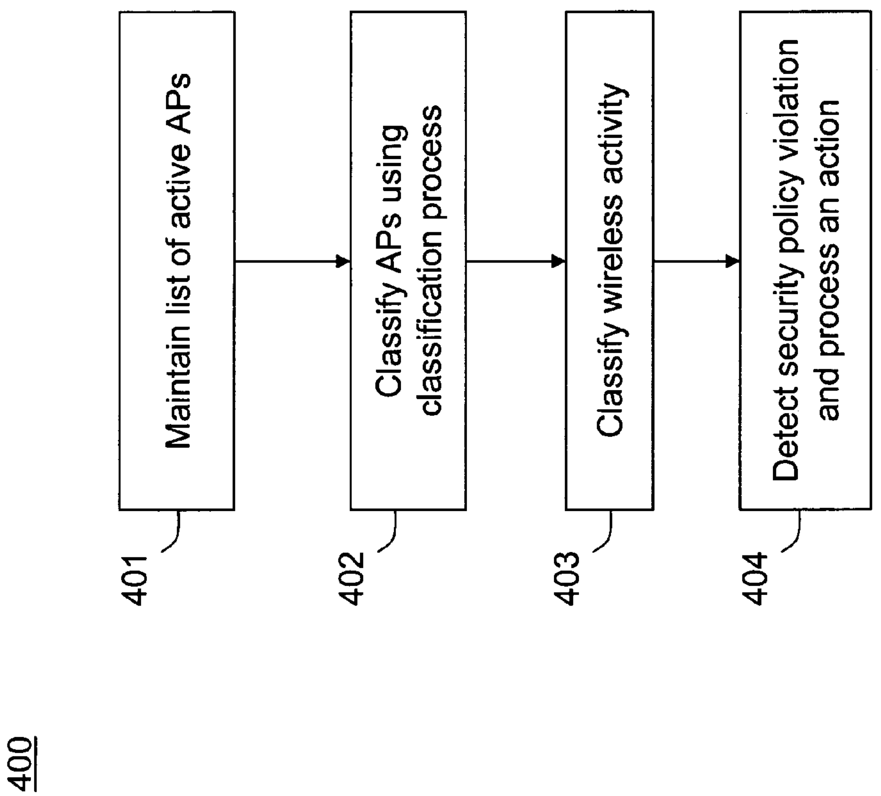
FIG. 4 illustrates a method to classify the wireless activity into to be permitted, denied or ignored according to the security policy according to an embodiment of the present invention.

In order to enforce the security policy, in a specific embodiment, the sniffers monitor wireless activity in the airspace. The wireless activity is classified into to be permitted, denied or ignored according to the aforementioned security policy. The method 400 according to this embodiment is illustrated in FIG. 4. This method can be used for the steps 214, 216, 218 and 220. This diagram is merely an example, which should not unduly limit the scope of the claims herein. One of ordinary skill in the art would recognize many variations, modifications, and alternatives.

As shown, the first step 401 is to maintain the list of "active APs". An active AP is defined as the AP that was recently involved in the wireless transmission as the transmitter or the receiver. An active AP can be detected by analyzing the wireless transmission on the radio channel captured by the sniffer. For example, every AP in the wireless network such as WiFi network periodically transmits a beacon packet for the client wireless stations to be able to connect to it. The beacon packet contains information such as clock synchronization data, AP's MAC address (BSSID), supported data rates, service set identifiers (SSIDs), parameters for the contention and contention-free access to the wireless medium, capabilities as regards QoS, security policy etc. In one embodiment, detection of beacon packet transmission from an AP is used to identify said AP to be an active AP. In alternative embodiments, active AP can also be detected when any other wireless transmission (data, control or management packet) directed to or generating from it is observed by the sniffer. Associated with each entry in the active AP list are a short timeout and a long timeout values. After a short timeout, the corresponding entry is marked "inactive" and after a long timeout it is marked "historic".

The second step 402 is to classify, using a classification process (described below), the APs in the active AP list into at least three categories, namely "authorized", "rogue" and "external". One or more tests are performed to classify active APs into these categories.

The third step 403 is classifying the wireless activity detected by the sniffers into to be permitted, denied or ignored categories based on the AP classification performed in step 402. For example, when a transmission of a beacon packet from a rogue AP is detected by the sniffer, the corresponding wireless activity is classified as to be denied. Also, when a packet transmission or a wireless connection establishment between a rogue AP and a wireless station (authorized, unauthorized or neighbor) is detected by the sniffer, the corresponding wireless activity is classified as to be denied. As another example, when a beacon packet transmission of an external AP or a packet transmission/wireless connection establishment between an external AP and an unauthorized or neighbor's wireless station is detected by the sniffer, the corresponding wireless activity is classified as to be ignored. Also, when a wireless activity associated with an authorized AP and an authorized wireless station is detected by the sniffer, the corresponding wireless activity is classified as to be permitted.

The fourth step 404 is to detect violation of security policy and process an action associated with the violation in accordance with the security policy. For example, in one embodiment, when a to be denied wireless activity is detected by the sniffer, an alert is generated. The alert can be logged. The alert can also be communicated to the network administrator using email, SMS (short message service), and the like. In another embodiment, the method sends an indication of the AP and/or the wireless station involved in the to be denied wireless activity to a prevention process. Preferably, the indication is sent almost immediately or before the transmission of one or few more packets by the AP or the wireless station. Depending upon the embodiment, the method sends the indication via an inter process signal between various processes, which can be provided in computer codes. Alternatively, the method performs a selected function within the same process code to implement the prevention process. While specific embodiment of method 400 was described, various alternatives will be apparent to those skilled in the art. Further, steps can be added, removed, or interchanged.

One embodiment of the prevention process works by preventing or breaking the "association" between the AP and the wireless station that are involved in the to be denied wireless activity. Association is the procedure defined in 802.11 standard wherein the wireless station and the AP establish a wireless connection between them. Techniques for preventing or breaking the association include but are not limited to transmitting one or more spoofed "deauthentication" or "disassociation" packets from one or more of the sniffers with the AP's MAC address as source address (e.g. with a reason code "Authentication Expired") to the wireless station or to a broadcast address, and sending one or more spoofed deauthentication or disassociation packets from one or more of the sniffers to the AP with the wireless station's MAC address as source address (e.g., with reason code "Auth Leave"). This is called "forced deauthentication" prevention process. Another embodiment of prevention process includes continuously sending packets from one or more sniffers with BSSID field containing MAC address of the AP and a high value in network allocation vector (NAV) field. All client wireless stations associated with the AP then defer access to radio channel for the duration specified in NAV field. This causes hindrance to the communication between the AP and its client wireless stations. This prevention process can be called "virtual jamming". According to an aspect of the present invention, the virtual jamming can be applied to selectively restrain only unauthorized wireless stations, while allowing authorized stations (notably, even on the same radio channel) to continue communicating. The "selective virtual jamming" can also be used to stop unauthorized devices from launching denial of service attack on the network. In yet an alternate embodiment of the prevention process, the sniffer overwhelms the AP with connection requests (e.g. association or authentication requests) thereby exhausting AP's memory resources (called "AP flooding"). Preferably, the sniffer sends connection requests using spoofed source MAC addresses. This can have the effect of the AP undergoing a crash, reset or reboot process thus making it unavailable to wireless stations for the sake of wireless communication for a period of time (e.g. few seconds or minutes depending upon the AP hardware/software implementation). A number of other embodiments such as inflicting acknowledgement (ACK) or packet collisions via transmissions from the sniffer, destabilizing or desynchronizing the wireless stations within the BSS (basic service set) of the AP by sending confusing beacon frames from the sniffer can also be used.

Figure 5:
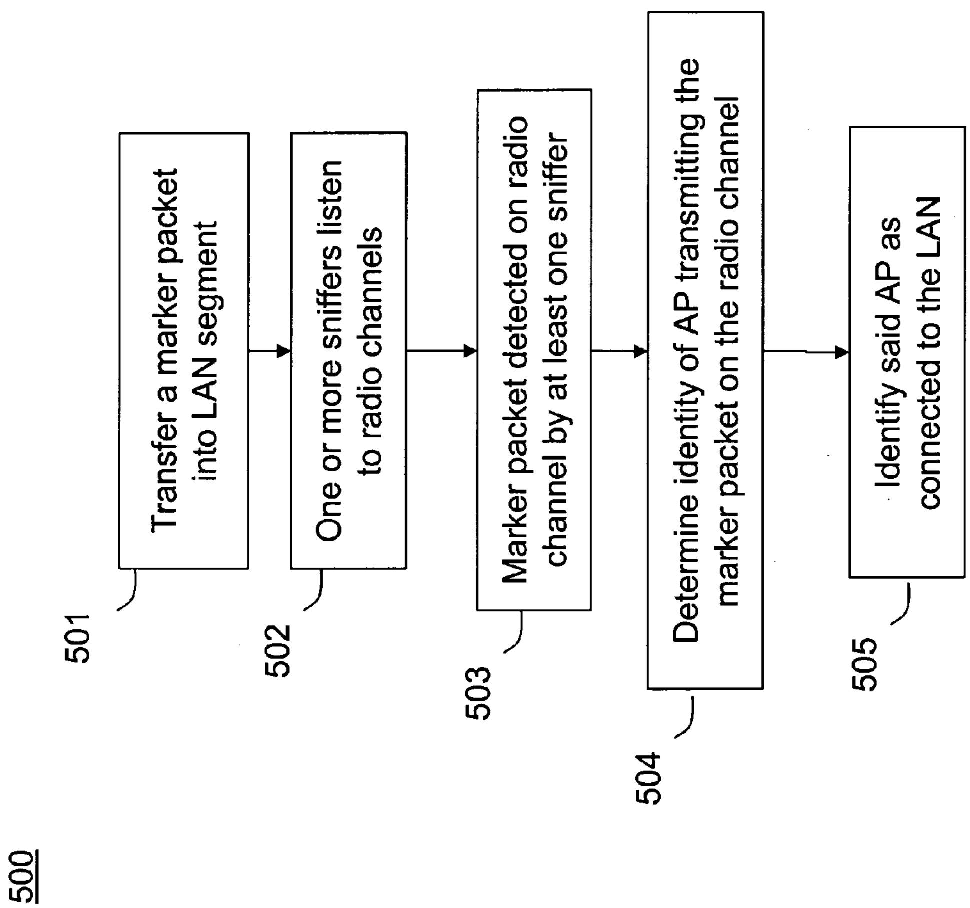
FIG. 5 illustrates a method in accordance with the connectivity test according to an embodiment of the present invention.

According to a specific embodiment of the method of invention, the classification process includes performing a "connectivity test" to distinguish the APs that are connected to the LAN segment (e.g., authorized or rogue) from those that are not connected to the LAN segment (e.g., external). The method 500 according to an embodiment of the connectivity test is illustrated in FIG. 5. This diagram is merely an example, which should not unduly limit the scope of the claims herein. One of ordinary skill in the art would recognize many variations, modifications, and alternatives. Also, steps can be added, removed, or interchanged. The method 500 can be used for the step 216 and 218.

As shown, in step 501 one or more test packets (called "marker packets") are transferred to the LAN segment by an originating device. In a specific embodiment, the originating device can be a sniffer, a security appliance or any computer system whose transmission can reach the concerned LAN segment over one or more computer networks. For example, the sniffer that is connected to the concerned LAN segment can transfer the marker packet via its Ethernet connection. The marker packet has a peculiar format using which it can later be identified by the intrusion detection system. The format can be different for different marker packets. The marker packet can contain a sequence number using which it can later be compared against the known marker packets. The marker packet may contain identity of the originating device. The marker packet is received by all or a subset of the APs connected to the concerned LAN segment and transmitted by all or a subset of them on the wireless medium.

In step 502, one or more sniffers listen to one or more radio channels. In step 503, preferably at least one sniffer detects the transmission of at least one marker packet on the radio channel. The marker packet is detected by analyzing the format of the captured packet. If the AP transmits marker packet on the radio channel without modifying it via encryption procedure all the format information in the captured packet is available to the security monitoring system for identifying marker packet. If the AP transmits marker packet on the radio channel after modifying it via encryption procedure the security monitoring system may not be able to analyze all the format information in the captured packet. In this case, certain features of the packet format that are unaffected by encryption procedure are used for analysis. For example, the encryption procedure does not change the size of the data being encrypted. Thus the size of detected packets can be used as a format parameter to identify said packet as the marker packet.

In step 504, the identity of the AP that transmits the marker packet is determined from the 802.11 MAC header (for example from the transmitter address or BSSID fields) of the packet transmitted on the radio channel. In step 505, the AP that transmits the marker packet is inferred to be connected to the LAN segment. Notably, if the AP is not connected to the LAN segment the marker packet cannot be transferred by the AP from the LAN segment to the wireless medium.

In one embodiment of the method 500, the marker packet can be an Ethernet style packet addressed to the broadcast address, i.e., the value of hexadecimal FF:FF:FF:FF:FF:FF in the destination address field of the Ethernet MAC header. This packet will be received by all APs that are connected to the LAN segment. The APs among these acting as layer 2 bridges then transmit this broadcast packet on the wireless medium after translating it to the 802.11 style packet. If the sniffer has originated the marker packet, it can identify the marker packet on the wireless medium from the source MAC address of the 802.11 style packet, which happens to be that of the sniffer. In an alternative specific embodiment, each of the sniffers is provided with the source MAC addresses of all the other sniffers in the system (e.g. by the security appliance as configuration data). This enables a sniffer to identify marker packet on the wireless medium, which is originated by another sniffer.

In an alternative embodiment, the marker packet can be an Ethernet style unicast packet addressed to the MAC address of a wireless station associated with (i.e., connected to) an AP. Said MAC address is inferred by analyzing the prior communication between the wireless station and the AP that is captured by one or more sniffers. This marker packet will be received by the AP if it is connected to the concerned LAN segment. The AP acting as layer 2 bridge then transmits the marker packet on the wireless medium after translating it to the 802.11 style packet.

In other alternative embodiments, the marker packet can be an IP packet addressed to the IP address of a wireless station associated with (i.e., connected to) an AP, an IP packet addressed to the broadcast IP address of the LAN segment, and like. In yet an alternative embodiment, the marker packet is not actively transferred to the LAN segment by the monitoring system. Rather, one or more broadcast/multicast/unicast packets from the data traffic on the LAN segment are used as marker packets. The logic being if an AP is connected to the same LAN segment as the sniffer, then at least a subset of data traffic seen by the Ethernet port of the sniffer will correspond to the data traffic captured by the sniffer on the radio channel. Thus the sniffer compares the packet captured on the radio channel with the packets transmitted over the wired LAN segment and captured by the sniffer's LAN connection port (Ethernet port) to identify a matching format.

The sniffer can detect the appearance of the marker packet on a specific radio channel only if the sniffer is tuned to that radio channel during the interval of transmission of the marker packet on that radio channel. It may thus be necessary to transfer marker packets in the LAN segment periodically and preferably at randomized intervals, so as to maximize the probability that at least one sniffer gets an opportunity to detect at least one marker packet transmitted by each AP connected to the LAN segment.

According to an alternative embodiment of the connectivity test, the sniffer transfers one or more marker packets to an AP over the wireless connection. The marker packet can be a UDP (User Datagram Protocol) packet, a TCP (Transmission Control Protocol) packet (e.g. TCP SYN packet), a ICMP (Internet Control and Messaging Protocol) packet, layer 2 frame etc., depending upon the embodiment. The sniffer can itself establish a wireless connection with the AP (e.g. 802.11 link layer connection or IP connection). Alternatively, it can use existing wireless connection between the AP and some wireless station for the purpose of transferring marker packet to the AP. For example, the sniffer can spoof the source address (e.g., MAC address, IP address, UDP/TCP port number etc.) in the marker packet as the address of the wireless station. Other parameters can also be spoofed. The marker packet can be addressed to the sniffer itself (i.e., MAC or IP address of the wired/Ethernet interface of the sniffer), the security appliance, another sniffer, any other network entity or a broadcast address. If the AP is connected to the LAN segment, these marker packets are transferred by the AP to the LAN segment from where they are transferred to the destination. Arrival of one or more marker packets at the destination is a test that the AP is connected to the LAN segment. Advantageously, this embodiment can detect rogue APs that implement NAT/router functionality unlike layer 2 bridge functionality, though it is also useful for the latter.

Figure 6:
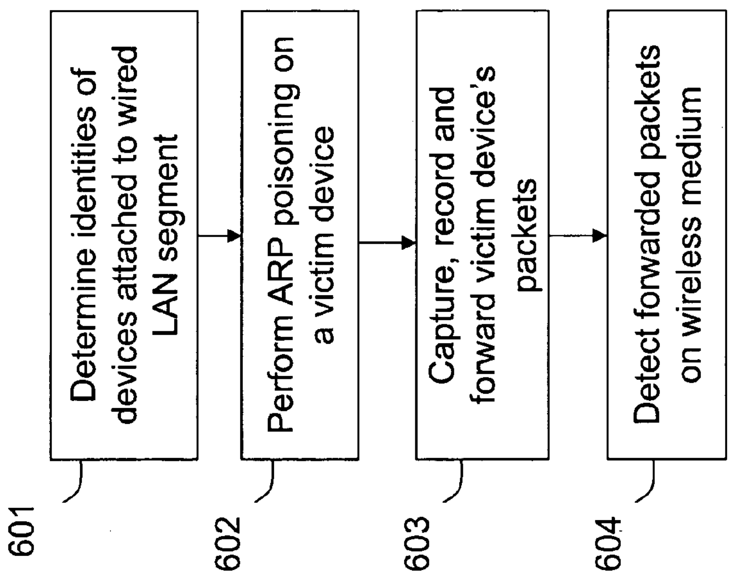
FIG. 6 illustrates a method in accordance with the connectivity test according to another embodiment of the present invention.

The method 600 according to yet an alternative embodiment of the connectivity test is illustrated in FIG. 6. This diagram is merely an example, which should not unduly limit the scope of the claims herein. One of ordinary skill in the art would recognize many variations, modifications, and alternatives. Notably, steps can be added, removed, or interchanged. Advantageously, this embodiment can detect rogue APs that implement NAT/router functionality, as well as use authentication and/or encryption on the wireless link. The method 600 can be used for the step 216 and 218 depending upon the specific embodiment.

As shown, in step 601, the sniffer determines identities (e.g. IP addresses) of devices attached to a wired LAN segment. Software tools such as "ettercap", "nmap" and others can be used for this purpose. These tools scan (for example, using ICMP ping packets, TCP SYN packets etc.) the IP addresses within the address range of the LAN segment to detect active IP addresses on the segment. Alternatively, the sniffer captures and analyzes the ARP (Address Resolution Protocol) transactions on the LAN segment to infer the IP addresses of the devices attached to the LAN. ARP request is used by the requester to query the MAC address corresponding to a given IP address and is a broadcast message on the LAN segment. ARP reply is sent to requester by the device owning the given IP address. The ARP reply is usually a unicast message to the requester and contains the MAC address of the responder. In one specific embodiment, the sniffer captures (e.g. over Ethernet connection) ARP request packets on the wired LAN. The ARP request packet contains IP address of the requester. This information is used by the sniffer to create the list of IP addresses.

In step 602, sniffer performs "ARP poisoning" directed to a device (called "victim device") detected on the wired LAN segment. The ARP poisoning involves sending ARP reply (usually unsolicited) from the sniffer advertising the sniffer's own MAC address as associated with the victim device's IP address. In one embodiment, the ARP reply is addressed to a broadcast address on the LAN segment. In an alternative embodiment, the ARP reply is unicast to each of the devices detected on the LAN segment, except the victim device. Other techniques to perform ARP poisoning can also be used. The sniffer can ARP poison one or more victims devices at any given time.

Upon ARP poisoning, the IP packets on the wired LAN segment that are destined to the victim device first arrive at the sniffer. The sniffer records information associated with these packets (e.g. content, header values, length etc.) and forwards them to the victim device (i.e., their correct destination), as shown by step 603. Alternatively, the sniffer fragments (e.g. as in IP packet fragmentation) the victim's packets and forwards one or more fragments to the victim device after storing information associated with the fragments. The fragmentation preferably renders specific characteristics (e.g. lengths) to fragments for ease of their later identification. Additionally, the fragment lengths can be chosen from a predetermined set. This enables a sniffer to identify a marker packet on the wireless medium, which is intercepted (e.g. after ARP poisoning) and forwarded by another sniffer.

As shown in step 604, the sniffer continues to monitor the packets transmitted by APs on the wireless medium. The characteristics (content, header values, length etc.) of packets detected by the sniffer over the wireless medium are examined. The examination reveals if any packet or a fragment of a packet earlier transferred by the sniffer to the wired LAN segment (i.e. upon ARP poisoning) has appeared on the wireless medium. If the match is detected, the AP that transmits said packet or fragment on the wireless link is inferred to be connected to the LAN segment.

In an alternative embodiment, NAT/router devices among the IP addresses detected on the LAN segment are identified. This advantageously reduces the number of victim devices (i.e., devices that need to be ARP poisoned). For example, an IP packet is transferred (e.g. by the sniffer) to the wired LAN segment with TTL (Time To Live) value in IP header set equal to 1 and the response to this packet is monitored. In a specific embodiment, the IP packet is addressed to arbitrary IP address and is transferred to the wired LAN segment as Ethernet broadcast packet (e.g. Ethernet destination address of hexadecimal FF:FF:FF:FF:FF:FF). Preferably, the NAT/router devices reply to this packet by ICMP "Time Exceeded" message. While host devices (e.g. PCs/laptops running Microsoft windows, Linux etc.) and server devices (e.g. mail server, WWW server, file transfer server etc.) do not send any response. In yet an alternative embodiment, NAT devices among the devices detected on the LAN segment are identified. For example, an IP packet addressed to a selected IP address and a selected UDP port is transferred by the sniffer to the wired LAN segment and the response to this packet is monitored. Preferably, the selected UDP port number is chosen to be from the range that is not typically used by UDP based applications (e.g. greater than 61,000). Preferably, the NAT device (i.e. with the selected IP address) does not send any ICMP reply to this packet. While the other devices (i.e. with the selected IP address) respond with ICMP "Destination Unreachable" message. Other alternative embodiment including, but not limited to, identifying gateway router devices (i.e., router devices that are not APs) from the configuration information received during DHCP (Dynamic Host Configuration Protocol) transactions, identifying non-AP devices from the vendor information derived from the Ethernet MAC address of these devices etc. can also be used to reduce the number of victim devices.

In yet an alternative embodiment, the sniffer generates and transfers packets on the wired LAN segment destined to the victim device. The information gathered from the earlier captured victim device's packet (e.g. subsequent to ARP poisoning the victim device) can be used to generate these packets. For example, the packets are generated addressed to UDP/TCP port inferred from the earlier captured packet. Preferably, whenever the sniffer switches to a new radio channel for monitoring wireless activity, one or more packets are generated and transferred to the victim device. This advantageously increases the chance of detecting these packets on the wireless medium. Notably, in a specific embodiment, the UDP/TCP packets generated by the sniffer contain null payload. In another specific embodiment, the TCP header and payload in the packets generated by the sniffer can be the same as those in the earlier captured packet. This advantageously avoids confusing or disrupting the UDP/TCP application on the client wireless station due to the packets generated by the sniffer. The sniffer may additionally fragment the generated TCP packet prior to transferring it to the wired LAN. Other embodiments of packet generation are possible and will be apparent to those with ordinary skill in the art.

In yet a further alternative embodiment, presence of NAT/Router AP in the airspace (e.g. hence need for ARP poisoning test) is inferred by monitoring the wireless activity associated with the AP. For example, if plurality of source MAC addresses or source MAC address that is different from BSSID are detected in the wireless data packets (i.e., as against 802.11 control and management packets) transmitted by the AP and captured by the sniffer, the corresponding AP is inferred to be a layer 2 bridge type AP. On the other hand, if no such source MAC addresses are detected for a certain period of time (and preferably across multiple client stations' connections), the corresponding AP is inferred to be a NAT/router type AP.

According to one specific embodiment, the classification process includes performing a "legitimacy test" to distinguish the APs that are "allowed" by the network administrator (e.g. authorized APs) from those that are "disallowed" (e.g. rogue and external APs).

One embodiment of the legitimacy test works by inferring one or more features of an AP via analysis of the packets captured by the sniffer and comparing them with the one or more features of the allowed APs. If the discrepancy is detected, said AP is inferred to be disallowed. For example, one or more features of an AP can be inferred by analyzing one or more beacon packets transmitted by the AP. These features include but not limited to vendor information (indicated by the first three bytes of the MAC address of the AP), observed beacon interval and values of various fields (according to basic 802.11 and its enhancements including 802.11e, 802.11i, 802.11k and others) in the beacon packet such as beacon interval, SSID, capabilities information, radio parameters, security settings, various information elements (IEs) etc. Some other features of an AP can be inferred by analyzing the sequence of packets flowing between the AP and a wireless station. Most notably, the flow of authentication and association procedure can be monitored by the sniffer to determine if it is consistent with that of an allowed AP. As merely an example, the flow of authentication and association procedure may conform to technologies such as wired equivalent privacy (WEP), wireless protected access (WPA), temporal key integrity protocol (TKIP), robust security network (RSN), extensible authentication protocol (EAP), and the like. The feature set of allowed APs can be provided to the intrusion detection system by the network administrator.

In some embodiments, the feature set comparison alone may not suffice to detect presence of disallowed AP devices in the airspace, i.e., if a disallowed AP masquerades as an allowed AP by advertising (e.g. in beacon packets) the same feature set (i.e., including MAC address) as the allowed AP. That is, the disallowed AP performs "MAC spoofing".

The method according an embodiment of the invention to detect MAC spoofing works by capturing beacon (or probe response) packets transmitted from an AP with a given MAC address, and recording values contained in the TSF (Time Stamp Field) of the beacon packets. The TSF is a 64-bit field in the IEEE 802.11 beacon packets that contains AP's timestamp. The TSF value represents value in microseconds and increments as the time progresses (for examples, by one count every microsecond interval). The TSF counter starts from zero every time the AP device is reset/(re)started. The method of present invention exploits this fact by computing an approximation to the reset/(re)start time of the AP device with a given MAC address from the TSF value contained in the captured beacon packet (e.g. reset/(re)start time=time instant the beacon packet from a given MAC address is captured–the TSF value), and detecting if reset/(re)start times computed for a given MAC address are apart from each other beyond reasonable margin of error (e.g. 1 second). If so, MAC spoofing (i.e., presence of disallowed AP masquerading as allowed AP) is inferred.

Figure 7:
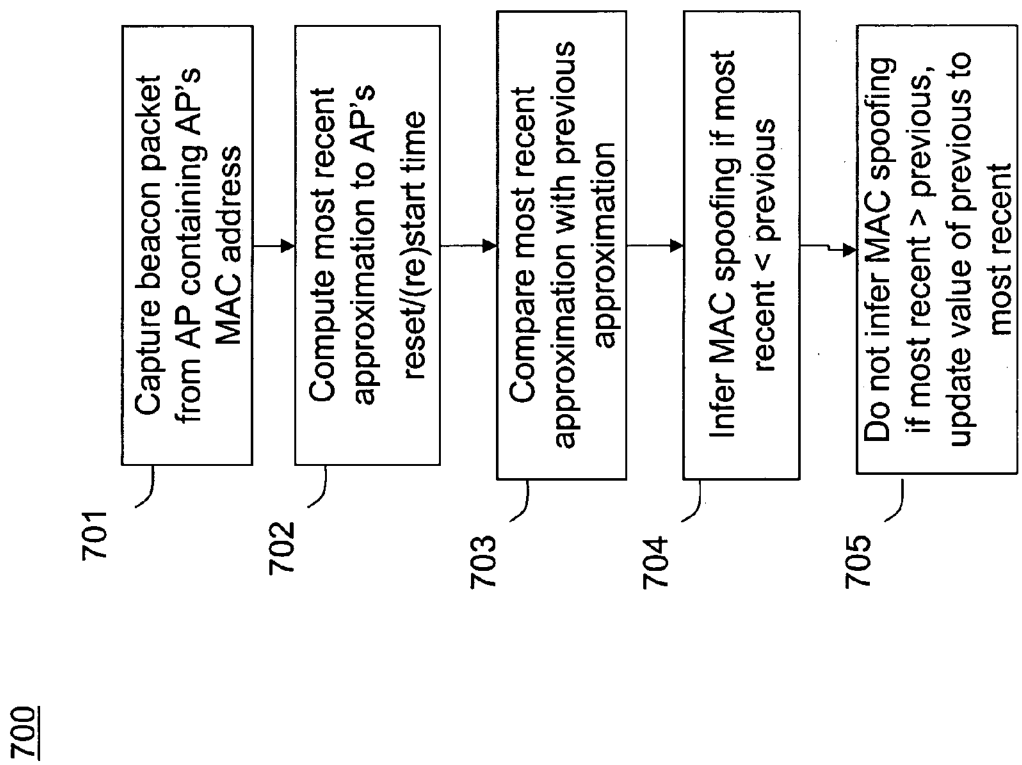
FIG. 7 illustrates a method to detect MAC spoofing according to a specific embodiment of the present invention.

A method 700 to detect MAC spoofing according to a specific embodiment is illustrated in FIG. 7. This diagram is merely an example, which should not unduly limit the scope of the claims herein. One of ordinary skill in the art would recognize many variations, modifications, and alternatives. The method 700 advantageously eliminates false positives resulting from an allowed AP indeed undergoing a reset/(re)start operation. This method can be used for the step 216 and 218. In step 701, a beacon packet transmitted from an AP with a given MAC address is captured by the sniffer. In step 702, a most recent approximation to reset/(re)start time of the AP with the given MAC address is computed as the capture time of the beacon packet minus the TSF value in the beacon packet. In step 703, the most recent value of approximation is compared with the approximation value computed (and stored) from a beacon packet from the given MAC address captured by the sniffer in the past. Preferably, the comparison is done within a reasonable margin of error, for example 1 second or 10 seconds. As shown in step 704, if the most recent approximation value is found smaller than the past computed value, MAC spoofing is inferred. As shown in step 705, if the most recent approximation value is found greater than the past computed value, MAC spoofing is not inferred so as to avoid false alarms due to reset/(re)start of an allowed AP.

Many alternative embodiments of method 700 are possible. Further, steps can be added, removed, or interchanged. In one embodiment, the hardware/software directed to execute the steps of the method 700 is provided within a single sniffer device. In an alternative embodiment, the foregoing method to detect MAC spoofing is performed in a distributed fashion. That is, information associated with or derived from TSF values in beacon packets from a given MAC address captured by plurality of sniffers is received (e.g. received by the security appliance) and processed as described before to detect MAC spoofing. The information associated with local reference times at different sniffers is used during the processing. The distributed operation advantageously detects MAC spoofing wherein the allowed AP device and the disallowed AP device are within the radio coverage range of different sniffers, but none of the different sniffers is able to capture beacon packets from both of these AP devices.

Figure 8:
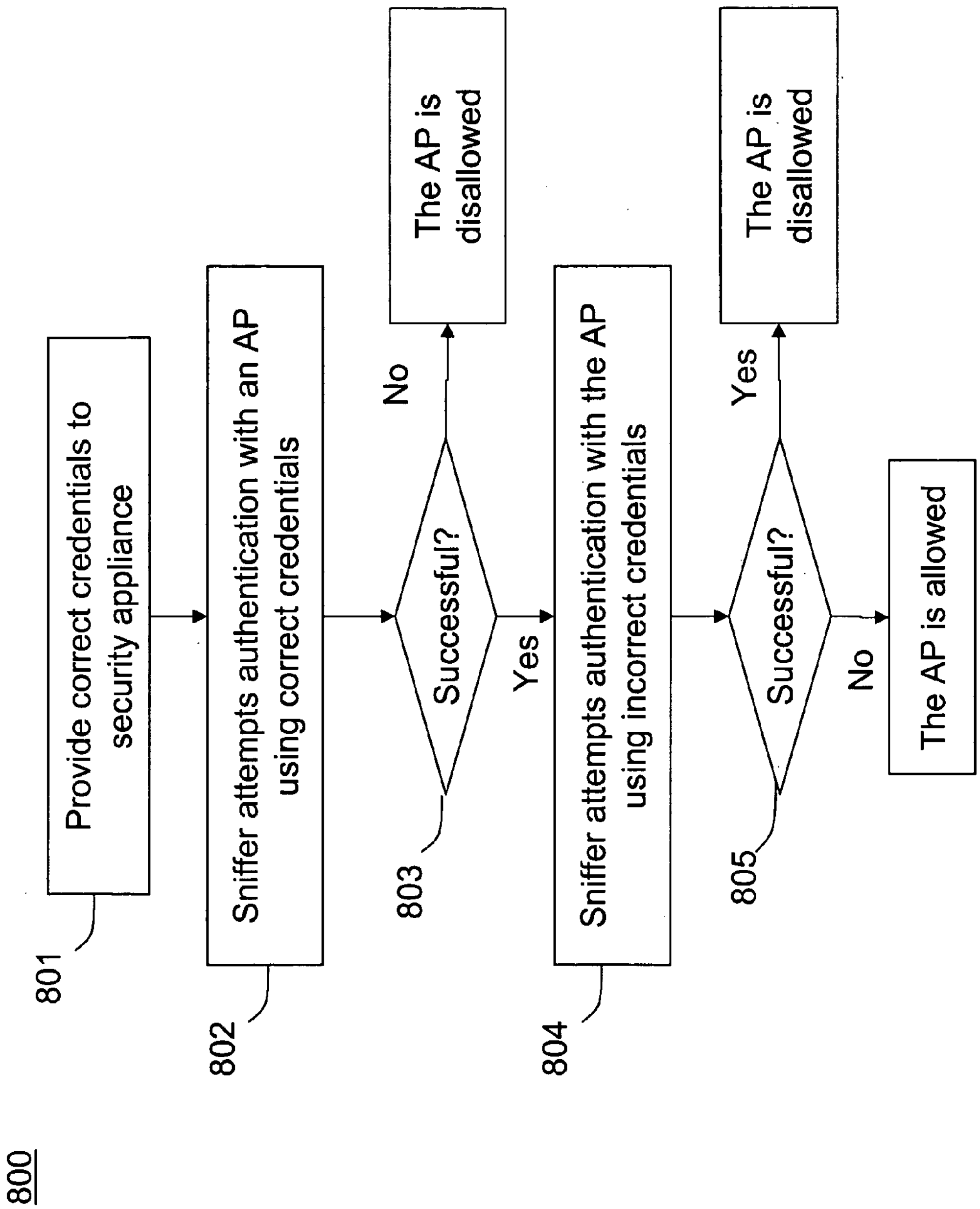
FIG. 8 illustrates a method in accordance with the legitimacy test according to an embodiment of the present invention.

The method 800 according to an alternative embodiment of the legitimacy test is illustrated in FIG. 8. This diagram is merely an example, which should not unduly limit the scope of the claims herein. One of ordinary skill in the art would recognize many variations, modifications, and alternatives. This method can be used for the step 216 and 218. Advantageously, the method 800 does not require the detailed feature set of the allowed APs to be manually entered into the system (i.e. security appliance) at initialization time. Notably, the manual data entry can be cumbersome if the total number of allowed APs is large (e.g. 50 or more). Also, in manual data entry procedure, when new allowed APs are deployed, manual intervention is required to provide their feature set to the intrusion detection system. Additionally, the embodiment of method 800 is resistant to MAC spoofing. The steps in this method are outlined below.

In step 801, the security monitoring system (sniffers and/or security appliance) is provided with the credentials that authorized wireless stations use to connect (i.e., authenticate and associate) to allowed APs. In a specific embodiment, the credentials are maintained in the security appliance (e.g., on a permanent storage device such as hard disk, flash memory etc.). The credentials are transferred (preferably in encrypted fashion) to the sniffer over the computer network (e.g., as a part of configuration data) and stored in the sniffer device in a volatile memory (e.g., RAM). The nature of credentials depends on the type of authentication mechanism used between authorized wireless stations and the allowed APs. For example, the credential is a WEP key. Other examples of credentials are security certificates, passwords, SIM (Subscriber Identity Module) card etc. which are usually used in EAP based authentication, for example, TLS over EAP, SIM over EAP, Kerberos over EAP, etc. as described in 802.11x or 802.11i specifications.

In step 802, a sniffer attempts authentication with an AP using the credentials provided, i.e. “correct” credentials. As shown in step 803, if the authentication is unsuccessful, the AP is inferred to be disallowed. However, if the authentication is successful, it is not possible to infer with confidence that the AP is allowed. This is because, it could be possible that the authentication is successful because said AP passively allows any device to connect to itself without indeed checking for the credentials.

To detect such situation, in step 804 the sniffer attempts authentication with the AP using the “incorrect” credentials. As shown in step 805, if the authentication is successful, the AP is inferred to be disallowed.

Many alternative embodiments of the method 800 are possible. Also, steps can be added, removed, or interchanged. For example, in one embodiment, the incorrect credential test is performed before the correct credential test. Other alternative embodiments include often changing order of execution of correct and incorrect credentials tests so that a disallowed AP is not able to exploit a predictable pattern to evade detection by these tests, repeating each of the correct and incorrect credentials tests a number of times (preferably said number being often changed or chosen in random/pseudorandom fashion) in a consecutive manner before switching to the other test, etc.

In some embodiments, the APs implement access control based on MAC address of client wireless stations. If the allowed APs implement MAC access control, the MAC address of the sniffer is included in the permitted list. Thus, if the authentication request from the sniffer is responded with error message or no message due to MAC access control on a disallowed AP, this itself is an indication that the AP is disallowed. In an alternative specific embodiment, the sniffer spoofs the MAC address of a wireless station that has attempted or successfully completed connection with the AP. That is, it uses said MAC address as source address in authentication request messages transmitted to the AP as well as receives (processes) authentication response messages transmitted by the AP to said MAC address.

Figure 9A:
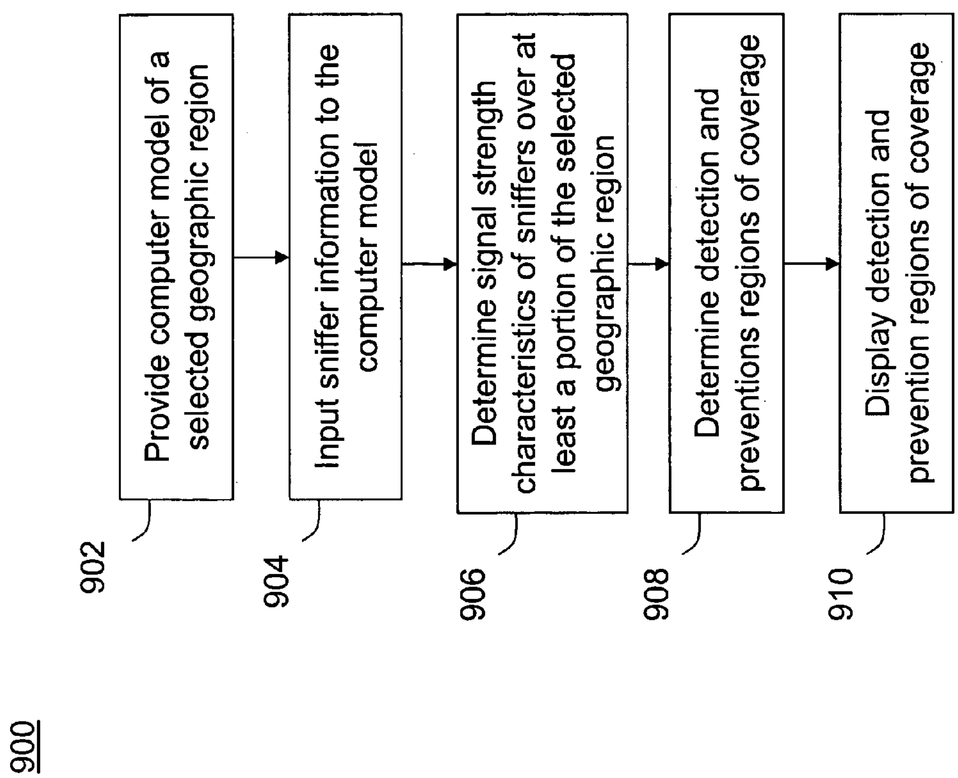
FIG. 9A illustrates a method to compute and display the radio coverage of the sniffers according to a specific embodiment of the present invention.

Proper spatial placement of sniffers (e.g. in relation to the layout of the selected region) is required to ensure that the security monitoring system provides comprehensive coverage of the portion of the unsecured airspace to be secured. That is, there are no open holes in the unsecured airspace. The present invention provides for determining if the sniffers substantially cover the portion of the unsecured airspace to be secured, based at least on their locations and radio coverage in relation to layout of the selected geographic region. Using information associated with the layout and the sniffer locations in a computer model, radio coverage of each of the sniffers is computed (i.e., predicted). Advantageously, the predicted radio coverage is displayed on a user interface of a display device (e.g. coupled to the security appliance) in relation to the layout of the selected geographic region to illustrate in visual form portions of the unsecured airspace that can be secured by the sniffers. According to a specific embodiment, the method can determine (e.g. based on visual illustration or programmatic computation) if the predicted radio coverage provides substantial coverage of the portion of the unsecured airspace to be secured. A method 900 according to a specific embodiment to compute and display radio coverage of the sniffers is illustrated in FIG. 9A. This diagram is merely an example, which should not unduly limit the scope of the claims herein. One of ordinary skill in the art would recognize many variations, modifications, and alternatives. This method 900 can be used for the step 212.

Figure 9B:
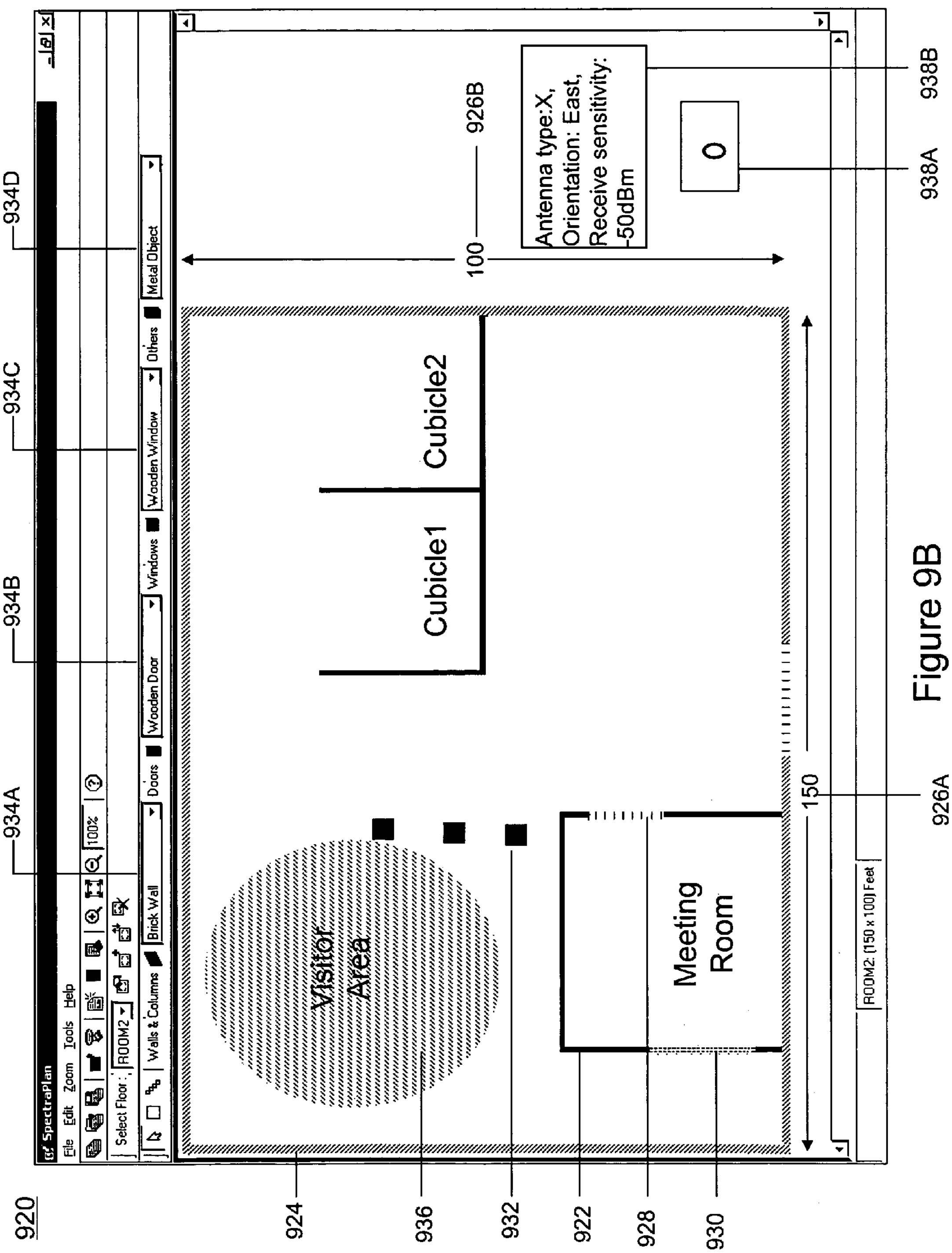
FIG. 9B shows an example of an annotated spatial layout of a selected geographic region displayed on a computer screen according to an embodiment of the present invention.

As shown, step 902 can provide a computer model of the selected geographic region. The computer model can include information associated with the layout components (e.g. physical dimensions, material type, location etc.) of the geographic region. The layout components include, but not limited to, rooms, walls, partitions, doors, windows, corridors, furniture, elevator shaft, patio, floor, parking lot and foliage. In a specific embodiment, the layout of the geographic region is displayed on a user interface of a display device. For example, FIG. 9B shows an example of a layout of a selected geographic region displayed on a computer screen. This diagram is merely an example, which should not unduly limit the scope of the claims herein. One of ordinary skill in the art would recognize many variations, modifications, and alternatives. As shown, the layout display includes information associated with the layout. In this embodiment, different material composition can be indicated by a different line pattern. For example, walls 922 could be made of brick, walls 924 could be made of concrete, a door 928 could be made of wood, a window 930 could be made of glass, and columns 932 could be made of sheet rock. In this embodiment, dimensions of various objects in the layout (e.g. dimensions 926A and 926B of concrete walls 924) can also be indicated. In this screen, a plurality of pull down menus 934A–934D can assist the user in annotating the layout image, i.e., to provide information regarding the layout components to the computer model. Additionally, information regarding areas of high people activity 936 (e.g. visitor area, copy room, cafeteria, corridors etc.) can be included in the computer model. The information regarding expected people density, their movement characteristics etc. can also be included (not shown in FIG. 9B).

Step 904 can input information associated with one or more sniffer devices to the computer model. For example, the input information includes locations of sniffers on the layout. Additionally, the input information can include sniffer hardware information (e.g. antenna type, receive sensitivity), software information (e.g. types of prevention processes supported), operating characteristics information (e.g. transmit power, scanning pattern) and like. In a specific embodiment, indications (e.g. icons) corresponding to sniffer devices are dragged from the icon tray and dropped (e.g. using computer mouse) at selected locations on the display of the layout. For example, in FIG. 9B, sniffer icon can be dragged from screen 938A and dropped at selected location on the layout image. The screen 938B can be used to provide additional information about the sniffer device. For example, said screen can pop up by clicking on the icon corresponding to a selected sniffer.

Step 906 can determine signal strength characteristics of the sniffers over at least a portion within or in a vicinity of the selected geographic region. Preferably, computer simulation using radio signal propagation model (e.g. ray tracing model, probabilistic radio propagation model etc.) is used to compute the signal strength characteristics. Specifically, the method can determine, the signal strength received at each of the sniffers from transmission emanating from each of the plurality of locations within or in a vicinity of the layout of the geographic region. By reversibility characteristic of radio propagation, this signal strength also represents received signal strength at each of the locations from transmission from the sniffer. Preferably, the signal strength characteristics are computed as probability data (described below).

Step 908 can determine detection region of coverage and one or more prevention regions of coverage for each of the sniffers. In a specific embodiment, these regions are determined based on the threshold signal strength or threshold signal to noise ratio associated with detection ability and prevention ability of the sniffer. Our extensive experimentation reveals that the effective distance over which the sniffer can hear the wireless signals for the purpose of detection of wireless activity differs from (usually greater than) the effective distance over which the sniffer can restrict the occurrence of the to be denied wireless activity (i.e., prevent wireless devices associated with the to be denied wireless activity from engaging in any meaningful wireless communication). This dichotomy results from the signal to noise ratio (SNR) and packet loss behavior of the wireless networks. For a wireless device that is "far" from a sniffer (e.g., link signal strength at −85 dbm or SNR of 5 db), the link packet loss percentage can be very high (e.g., 90%). Thus, the sniffer can detect the presence of the wireless device as it can "hear" at least some packets from the device. However, when the sniffer attempts to restrict the wireless communication associated with the wireless device, it will not be successful due to high link packet loss. In other words, many of the packets transmitted by the sniffer that are directed to restrict the wireless device may not in fact reach the device and hence will not have the desired effect on the device.

Based on our extensive experimentation with different wireless devices, we also observe that the actual range of prevention depends on the characteristics of the wireless device that is to be restricted from wireless communication. This follows from the fact that different wireless devices have different antenna characteristics, receive sensitivities, receiver characteristics, MAC protocol implementation, and the like. Thus, the sniffer may be able to restrict a wireless device of one vendor, whereas fail to restrict another vendor's device at the same distance. Or, the sniffer may be able to restrict a wireless device of one model from a given vendor, whereas fail to restrict another model from the same vendor at the same distance. We have also observed that the actual range of prevention depends on the ambient noise. This follows from the fact that at high noise level (or equivalently low SNR), the packet loss rate increases.

We have observed from our experiments that the prevention range is also application specific. This is due to the fact that, the packet loss rate that needs to be inflicted for making an application non-functional can be different for each type of application (e.g., TCP, UDP or ICMP). For example, disrupting a TCP file transfer can be possible at a lower SNR than blocking an ICMP ping reliably.

In a specific embodiment, the prevention region of coverage is determined directed to a specified objective. Examples of objectives include, but not limited to, restricting specific types of intruder devices (e.g. devices from specific vendor, devices with specific antenna characteristics etc.), restricting wireless devices only during nighttime (i.e., low noise environment), restricting wireless devices that have certain receive sensitivity, disrupting only TCP traffic, inflicting a certain packet loss rate etc. The detection ability mainly depends upon transmit power level and antenna characteristics of the wireless device.

The prevention signal strength thresholds for achieving various objectives as well as the detection signal strength thresholds are determined based on experimentation in controlled laboratory environment and stored in a library. The library is referred while determining detection and prevention regions of coverage.

According to a specific embodiment, a set of locations within or in a vicinity of the layout are identified such that if a transmitter were to be placed at any of these locations, the signal power received at the sniffer is above the detection signal strength threshold. The corresponding set of locations constitutes a detection area of coverage. Additionally, a set of locations within or in a vicinity of the layout are identified such that if a transmitter were to be placed at any of these locations, the signal power received at the sniffer is above the prevention threshold. The corresponding set of locations constitutes a prevention area of coverage.

Figure 9C:
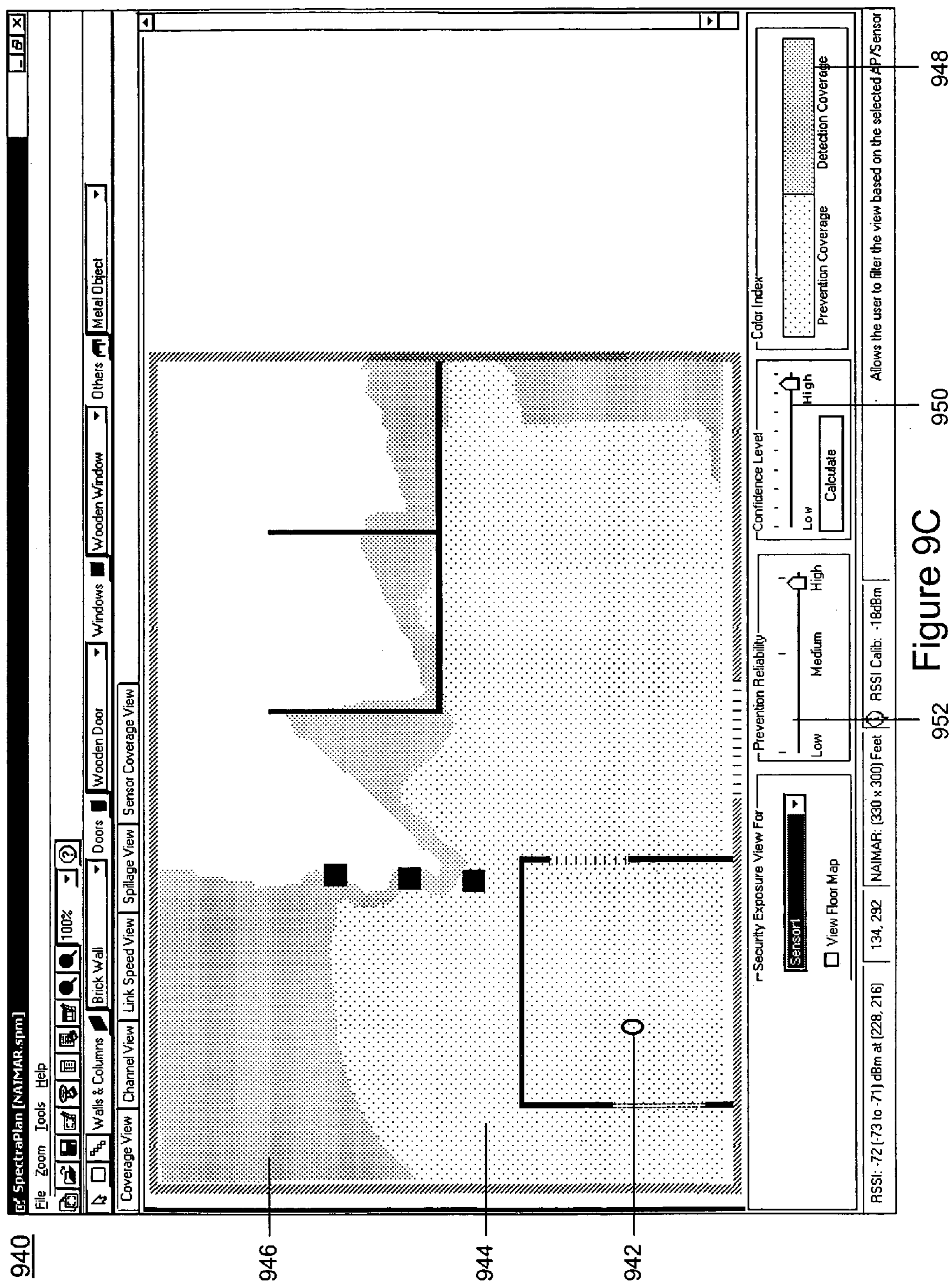
FIG. 9C shows an example of a display of detection and prevention regions of coverage illustrated in relation to the layout of FIG. 9B, according to an embodiment of the present invention.

Step 910 can display the detection region of coverage and the prevention region of coverage in relation to the layout of the selected geographic region, either separately or simultaneously. For example, FIG. 9C shows an example of a computer display 940 of detection and prevention regions of coverage illustrated in relation to the layout 920. This diagram is merely an example, which should not unduly limit the scope of the claims herein. One of ordinary skill in the art would recognize many variations, modifications, and alternatives. While specific embodiment was described various alternatives are possible. Also, steps can be added, removed, or interchanged in method 900.

As seen in FIG. 9C, a sniffer device (also called as "sensor") is shown at location 942. The detection region of coverage 946 and the prevention region of coverage 944 are shown. In a preferred embodiment, the regions 944 and 946 are shown by different colors, the legend 948 for colors being provided. In an alternate embodiment, the regions 944 and 946 are shown in separate views, each in relation to the layout. In other alternative embodiments, the regions can be shown via different fill patterns, contours, gradations of one or more colors, and the like. Preferably, the detection region of coverage is larger than the prevention region of coverage. The "prevention reliability" index 952 is used to select the degree of disruption to be inflicted on the intruder device by the prevention process. In one specific embodiment, the degree of disruption corresponds to the packet loss rate to be inflicted on the intruder device.

In a specific preferred embodiment, in steps 906 and 908 a measure of confidence is used while determining if the signal strength computed for a specific location is above or below a threshold. That is, the probability that signal power computed for the specific location being above a detection or a prevention threshold is computed and the location is included in the corresponding set only if the probability is large enough (for example, more than 90% when the desired confidence is high and more than 30% when the desired confidence is low). This is done to account for prediction uncertainties and signal variations intrinsic to wireless communication environment and provide the user with realistic security coverage analysis. The desired level of confidence can be selected by the user, for example, by entering a percentage value, using pull down menu, using a slider bar displayed on the screen (e.g. as shown by label 950 in FIG. 9C) etc. The probabilities are computed based upon the probabilistic model for signal strengths (described below).

Figure 9D:
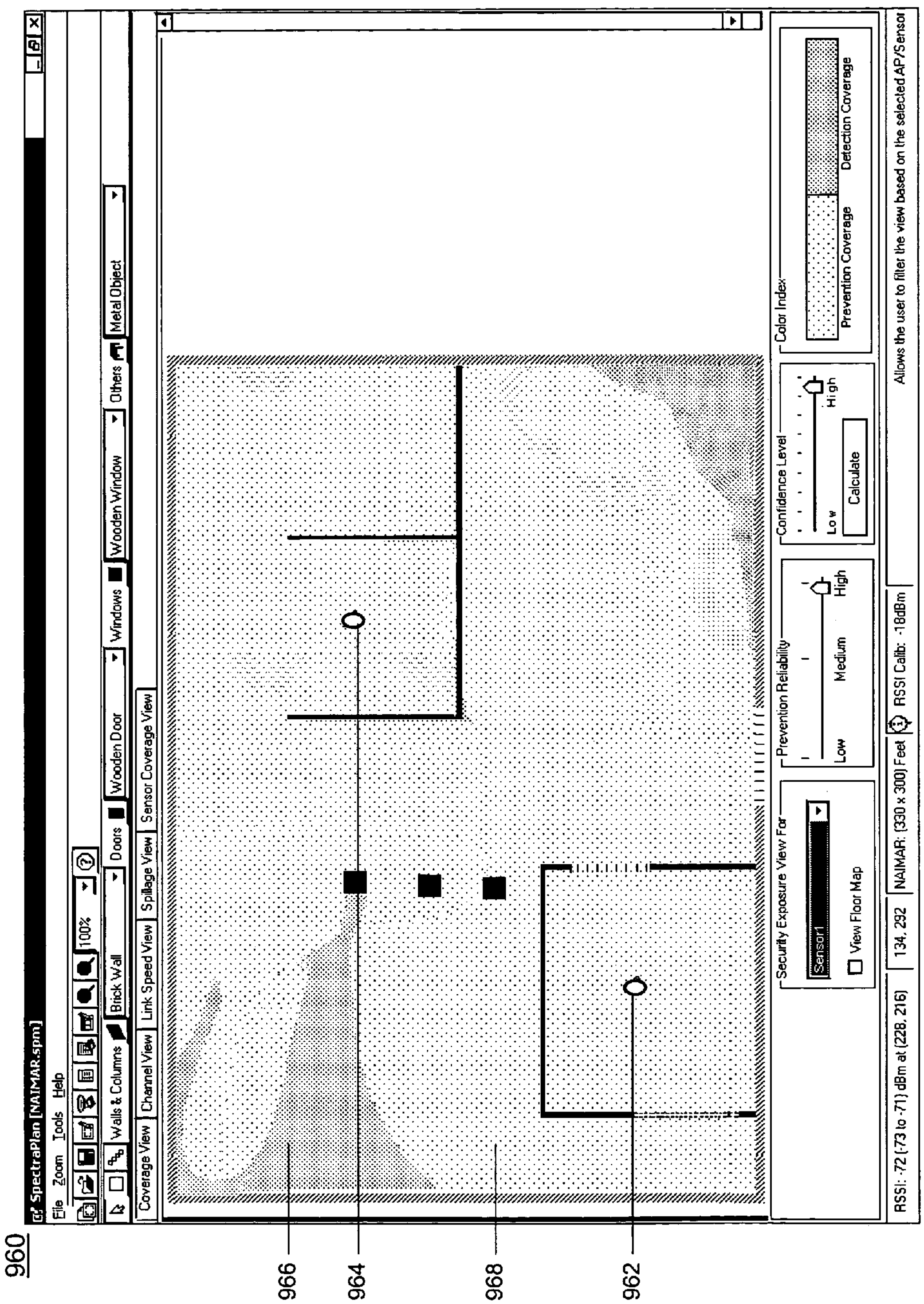
FIG. 9D shows another example of a display of detection and prevention regions of coverage illustrated in relation to the layout of FIG. 9B, according to an embodiment of the present invention.

FIG. 9D shows an example of computer screenshot 960 illustrating combined detection and prevention regions, 966 and 968 respectively, of two sniffers positioned at locations 962 and 964. As seen, the combined detection region 966 covers the entire floor, while the combined prevention region 968 covers most of the floor. This diagram is merely an example, which should not unduly limit the scope of the claims herein. One of ordinary skill in the art would recognize many variations, modifications, and alternatives.

The sniffers can be physically deployed at locations determined as above. The method can further include inputting information associated with authorized wireless network components (e.g. APs, wireless stations) to the computer model. The information can include location information on the layout, AP hardware (e.g. vendor, model, antenna type etc.), software (e.g. firmware and software version) and operating characteristics (e.g. type of 802.11 protocol a,b or g, transmit power etc.). In one specific embodiment, indications (e.g. icons) corresponding to AP devices are dragged from the icon tray and dropped (e.g. using computer mouse) at selected locations on the display of the layout. Clicking on respective icon can pop up a window for inputting AP device information.

In an alternative specific embodiment, after the sniffers are physically deployed, indications associated with at least the authorized AP devices detected by the sniffers are programmatically placed on the display of the layout. That is, the authorized APs are identified by the sniffers by capturing wireless activity associated with the APs. Based on signal strengths received by one or more sniffers, the physical locations of the authorized AP devices on the layout are computed (described below). Using at least the computed locations, the indications are placed on the layout at appropriate locations. For example, the authorized AP indications are placed on the layout based on the computed locations and the user performs fine tuning of location indications (e.g. finely adjusts the locations of icons by dragging them with computer mouse) based on some secondary information (e.g. prior knowledge available to user regarding exact locations of authorized APs). As another example, the secondary information is programmatically used to fine tune locations of AP indications (e.g. an AP indication is placed at a location known from secondary information that is closest to the computed location for the corresponding AP). For example, the secondary information can be made available from the network planning phase. The feature set associated with each of the authorized APs (e.g. MAC address, vendor, security settings, SSID, radio channel of operation, type of radio a, b or g etc.) can also be programmatically provided with the indication based on the sniffer observations. For example, upon clicking on AP icon on the layout, a window providing feature set information (that is as obtained from sniffer observations) is displayed.

The method further includes determining signal strength characteristics of the APs over at least a portion within or in a vicinity of the selected geographic region. Preferably, computer simulation using radio signal propagation model (e.g. ray tracing model, probabilistic radio propagation model etc.) is used to compute the signal strength characteristics. Specifically, the method can determine, the signal strength received at each of the plurality of locations within or in a vicinity of the layout of the geographic region from transmission emanating from each of the APs. The method further includes displaying indication associated with radio coverage of each of the authorized APs on a user interface of a display device, in relation to the layout of the geographic region. Other views derived from signal strength computations such as link speed view, interference view, channel allocation view and the like, can also be shown.

Figure 9E:
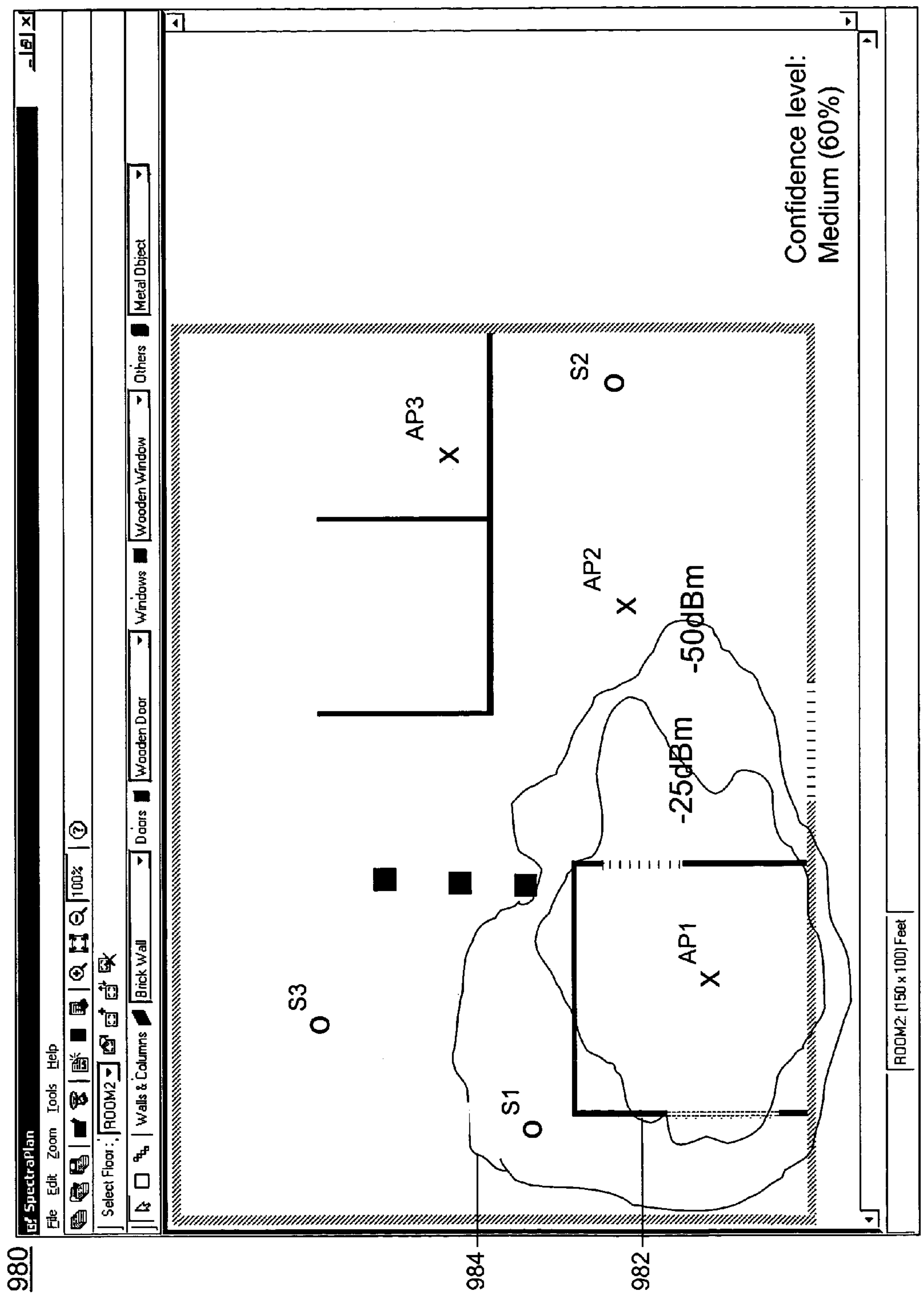
FIG. 9E shows an example of a display of AP coverage illustrated in relation to the layout of FIG. 9B, for a selected configuration of sniffers and APs, according to an embodiment of the present invention.

FIG. 9E shows another example of a computer screenshot 980, for a selected configuration of sniffers and APs. This diagram is merely an example, which should not unduly limit the scope of the claims herein. One of ordinary skill in the art would recognize many variations, modifications, and alternatives. As shown, sniffer devices S1, S2, S3 and APs AP1, AP2 and AP3 are indicated on the layout. The screenshot illustrates radio coverage of AP1 in relation to the layout of the selected geographic region. As seen, three regions separated by boundaries 982 and 984 correspond to three signal strengths associated with a transmission from the AP1. Each region can be associated with a range of signal values (e.g. a first region could be associated with a signal strength of 'more than −25 dBm', a second region could be associated with a signal strength of 'between −25 dBm and −50 dbm', and a third region could be associated with a signal strength of 'less than −50 dBm'). In one embodiment, the signal strength regions can be shown by different colors. In another embodiment, the signal strength regions can be shown via different fill patterns, contours, and/or gradations of colors. Note that signal strength regions for multiple authorized wireless devices can be shown on the same computer screen.

Notably, in this manner the method can determine which of the authorized APs can be detected by each sniffer. For example, assume that the receive sensitivity of sniffers S1 and S2 is −50 dBm. Then, in the foregoing example, AP1 can be detected by sniffer S1, but cannot be detected by sniffer S2. According to an aspect of the method of invention, a baseline data comprising a list of detectable authorized APs is created for each of the sniffers based on the radio coverage computation. For example, the AP1 will be indicated as being detectable in the baseline data corresponding to the sniffer S1, whereas the AP1 will not be indicated as detectable in the baseline data corresponding to the sniffer S2. Additionally, the baseline data can further include the receive signal strength that the sniffer is expected to hear from the detectable AP. In present example, the expected receive signal strength from the AP1 at sniffer S1 will be indicated as 'between −25 dBm and −50 dBm' in the baseline data for S1.

In a specific embodiment, upon capturing wireless activity from an AP using the sniffer, the method can determine if the AP's identity is included in the baseline data associated with the corresponding sniffer. Additionally, the sniffer can determine (e.g. measure) the received signal strength from the wireless activity and compare it with the receive signal strength value in the baseline data associated with the corresponding AP. If any inconsistency with the baseline data is detected (e.g. the AP's identity not indicated as detectable and/or the receive signal strength too high or low compared to the baseline data), the captured wireless activity can inferred as to be denied. The foregoing embodiment can advantageously detect events associated with physical change of authorized AP's location (usually without authorization form system administrator), tampering with authorized AP's antenna, presence of unauthorized AP in the airspace that is masquerading as authorized AP (i.e., MAC spoofing), and so on. Notably, the method can detect MAC spoofing even when the genuine AP is not operation and only masquerading AP is operational. This is significant advantage over some conventional techniques that require both the genuine and masquerading APs to be operational to detect MAC spoofing.

The foregoing embodiments include predicting signal strength characteristics of sniffers/APs. According to a specific embodiment, the signal strength values for coverage prediction can be computed by using a "ray tracing" simulation method. The ray tracing method is described in a paper by Reinaldo Valenzuela of AT&T Bell Laboratories, entitled "A ray tracing approach to predicting indoor wireless transmission", published in 43rd EEE Vehicular Technology Conference in 1993. In this method, the strength (e.g. power) of a signal emanating from a transmitter at one location and received at another location (after the signal has suffered reflections and passed through obstructions within the layout) can be computed. Note that by reversibility characteristic of radio propagation, this value also corresponds to the signal power value when the transmitter and the receiver locations are interchanged.

Assume that the signal power at a reference distance 'K' along every direction from a transmitter equals 'P_K'. The signal power is measured in units of decibels known as dBm, wherein 1 dBm=10 Log (Power in Watts/1 milliWatt). If the transmitter uses directional antenna, the signal power at a reference distance 'K' along any direction from a transmitter is also a function of the direction.

An exemplary equation for the power 'P_D0' at a point 'D' after the signal travels the distance 'd0+K' from the transmitter, and does not encounter any obstruction or reflection is given as follows:

$$P\_D0\ (\text{dBm}) = P\_K\ (\text{dBm}) - n*10\ \log\ (d0/K)$$

where n is the exponent associated with radio wave propagation loss. For example, n=2 or n=1.7.

An exemplary equation for the power 'P_D' at a point 'D' after the signal travels a distance 'd1+K' from the transmitter, and suffers losses due to an obstruction 'L1' is given as follows:

$$P\_D1\ (\text{dBm}) = P\_K\ (\text{dBm}) - n*10\ \log\ (d1/K) - L1\ (\text{dBm})$$

An exemplary equation for the power 'P_D2' at a point 'D2' after the signal travels the distance 'd2+K' from the transmitter, and suffers losses due to obstructions 'L1' and 'L2' and loss due to reflection 'R1' is given as follows:

$$P\_D2\ (\text{dBm}) = P\_K\ (\text{dBm}) - n*10\ \log\ (d2/K) - L1\ (\text{dBm}) - R1\ (\text{dBm}) - L2\ (\text{dBm})$$

Similarly, the powers at any point 'D' due to all possible signal components are computed and added to generate the overall power prediction of the signal at point 'D'.

Note that the exact quantification of variables such as 'L1', 'R1', and 'L2' is often difficult and inaccurate. Additionally, a number of times the user does not know/provide adequate information regarding, for example, the dimensions or the material properties of layout objects, that is to the level of accuracy required for radio level signal prediction.

In one embodiment, a probabilistic model (e.g. a Gaussian probability distribution) can be used to account for such uncertainties. This probabilistic model can take into account inherent uncertainties associated with the radio characteristics (e.g. reflection loss, pass-through loss etc.) of layout objects as well as uncertainties arising out of inadequate specification of layout objects. In one embodiment, each of these variables can be modeled by using a Gaussian probability distribution. The mean and variance of the probability distribution associated with pass-through loss and reflection loss due to various types and sizes of objects can be determined based on laboratory experimentation and stored in the database.

In another embodiment, the probabilistic model can take into account signal variations resulting from changes in the environment (e.g. movement of people). For example, the signal path that passes through areas of high activity (e.g. cafeteria, corridors, conference rooms) exhibits a higher variability in signal strength. Other types of factors resulting in signal uncertainty or variations such as imprecise knowledge of antenna radiation pattern and/or orientation of devices can also be accounted for by assigning appropriate variance to signal loss due to these factors. The total signal power at the reception point is then modeled by Gaussian probability distribution having mean and variance equal to the sum of mean and variance respectively, of signal powers from all signal paths arriving from the transmission point at the reception point.

Figure 10:
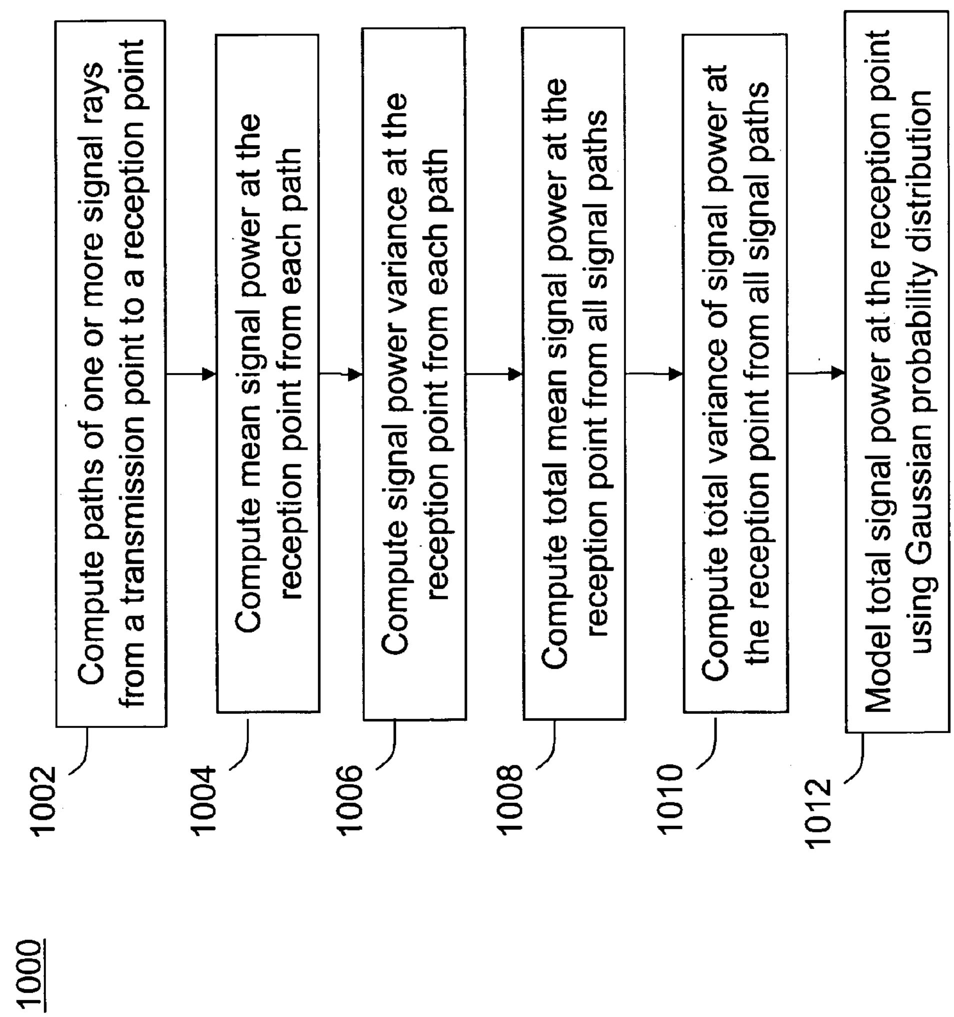
FIG. 10 illustrates an exemplary method to predict radio signal coverage according to a specific embodiment of the present invention.

FIG. 10 illustrates an exemplary method 1000 to predict radio signal coverage. This diagram is merely an example, which should not unduly limit the scope of the claims herein. One of ordinary skill in the art would recognize many variations, modifications, and alternatives. A specific embodiment of the method is described, though alternative embodiments are possible. Notably, steps can also be added, removed, or interchanged in alternative embodiments. The method 1000 can be used for the step 212. In method 1000, step 1002 can compute the paths of signal rays from a transmission point to a reception point. In one embodiment, the paths are determined using a ray tracing technique. Both the direct path as well as paths encountering one or more reflections while traveling from the transmission point to the reception point can be computed.

Each of the signal paths may traverse (i.e. pass through) one or more obstacles in reaching the reception point. Therefore, at step 1004, the mean signal power from each signal path arriving at the reception point can be computed accounting for the signal attenuation (loss) at the pass-through and reflection points. In one embodiment, the attenuation values in steps 1002 and 1004 can be taken from values stored in a library built using experimentation in laboratory environment.

At step 1006, for each of the signal paths, a variance can be assigned to attenuation value at each pass-through and each reflection. In one embodiment, the variance can be dependent on the material characteristics of the object associated with pass-through/reflection. For example, the variance associated with pass-through attenuation at a concrete wall object is significantly greater than that associated with the glass wall object. Note that structures of steel may be embedded within the concrete wall. This embedded information is typically not known to the network administrator/end user and hence not specified in the computer model of the layout. Thus, there is larger uncertainty in predicting the pass-through attenuation through the concrete wall.

In another embodiment, the variance is dependent upon the dimension of the object associated with the pass-through. In yet another embodiment, the variance is dependent upon the level of accuracy with which the characteristics of the object are specified in the computer model of the layout. For example, the variance associated with reflection from the metal object is significantly smaller than the variance associated with reflection from the wood object. That is, metals are excellent reflectors of radio waves. Thus, reflection losses at metal object can be predicted with better accuracy and hence the smaller variance. In yet another embodiment, variance is also assigned corresponding to traversal of signal path through area of high activity (e.g. corridors, conference rooms, cafeterias, copy rooms, and restrooms). In yet a further alternative embodiment, variance is assigned to traversal of signal path through objects such as door and windows which exhibit different radio propagation behavior depending on whether the door/window is open, closed, partially open etc.

At step 1008, the mean signal power at the reception point can be computed as the sum of mean signal powers from all the signal paths from the transmission point to the reception point. At step 1010, the variance of signal power at the reception point can be computer as the sum of the variances of signal powers from all the signal paths from the transmission point to the reception point. At step 1012, the signal power at the reception point can be modeled by Gaussian probability distribution with computed mean and computed variance.

In one embodiment, a level of confidence is associated with the prediction. The confidence level (also called "signal certainty index") is selected by user (e.g. represented as low-medium-high, as percentage, etc.). For example, for a given percentage of confidence level, the value of signal power inferred (predicted) and rendered associated with the reception point is such that the probability of signal power value being greater than the inferred value is at least equal to the confidence level. The probability is computed based on the probability distribution of signal power.

Figure 11:
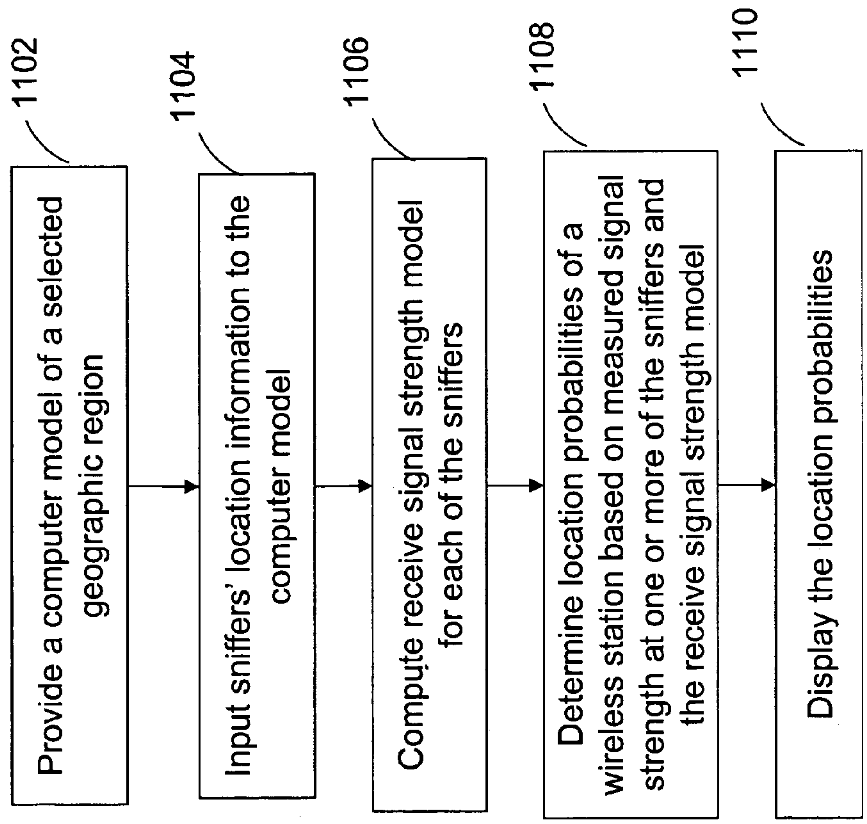
FIG. 11 illustrates a method to display indication associated with physical location of a wireless transmitter according to an embodiment of the present invention.

The method according to present invention can also determine (i.e. predict) the physical location of the originator of wireless activity (e.g. to a selected level of certainty or probability), based on the predicted radio coverage and the actual (i.e., observed) receive signal strengths from the wireless activity at one or more of the sniffer devices. Advantageously, when a to be denied wireless activity is detected, the physical location of the transmitter of the wireless activity is determined and an indication of location is displayed on the computer screen in relation to the layout of the geographic region. For example, when the beacon packets or other packets transmitted by rogue AP are detected, the indication of physical location of the rouge AP can be shown on the layout. As another example, when the wireless activity associated with denial of service attack (e.g. authentication/association flood attack, deauthentication/dissociation flood attack, NAV attack etc.) from an unauthorized wireless station is detected, the indication of physical location of said station can be shown on the layout. This facilitates tracking down the unauthorized device and, for example, physically remove it from the network. A method 1100 to determine physical location of transmitter is illustrated in FIG. 11. This diagram is merely an example, which should not unduly limit the scope of the claims herein. One of ordinary skill in the art would recognize many variations, modifications, and alternatives. Notably, the method 1100 can be used for the step 220.

The first step (1102) is to provide a computer model of a selected local geographic region. The second step (1104) is to provide input regarding physical locations of one or more sniffer devices to the computer model of the selected geographic region.

The next step (1106) can compute signal strength characteristics (called "signal strength model") associated with the one or more sniffers over at least a portion of the selected geographic region. Specifically, receive signal strength at each of the one or more sniffers from a radio transmission emanating from each of the plurality of location points within the selected geographic region is computed. This computation takes into account information associated with components of the layout of the geographic region as available in the computer model. In one specific embodiment, the signal model is based on the predictions of receive signal strength done via simulations using techniques including, but not limited to, ray tracing. In an alternative specific embodiment, the signal model is based on the observed signal strength data obtained via site survey wherein the transmitter is placed at plurality of locations, one at a time, and received signal strength at each of the one or more sniffer devices is recorded. Techniques such as interpolation, extrapolation, curve fitting and like can then be used to create the signal strength model using the observed data. The combination of predictive and observation based techniques may also be used. For example, in one specific embodiment, the signal strength observations are recorded based on transmissions emanating from existing devices with known location references (e.g., other sniffers, access points etc.) and these observations are used to fine-tune the predictive signal strength model. The site survey observations can also be used to fine-tune the predictive signal strength model.

The next step (1108) can determine physical location of transmitting wireless station based on the receive signal strength measurements performed by one or more sniffer devices and the signal strength model. In particular, the probabilities of the wireless station being located at one or more locations within the selected geographic region are determined.

In step (1110), the probabilities or values proportional to probabilities computed above are shown on the computer display in relation to the layout of the geographic region. In a specific embodiment different probabilities or ranges of probabilities are shown via plurality of colors, gradations of one or more colors, different fill patterns, regions, contours etc.

Figure 12:
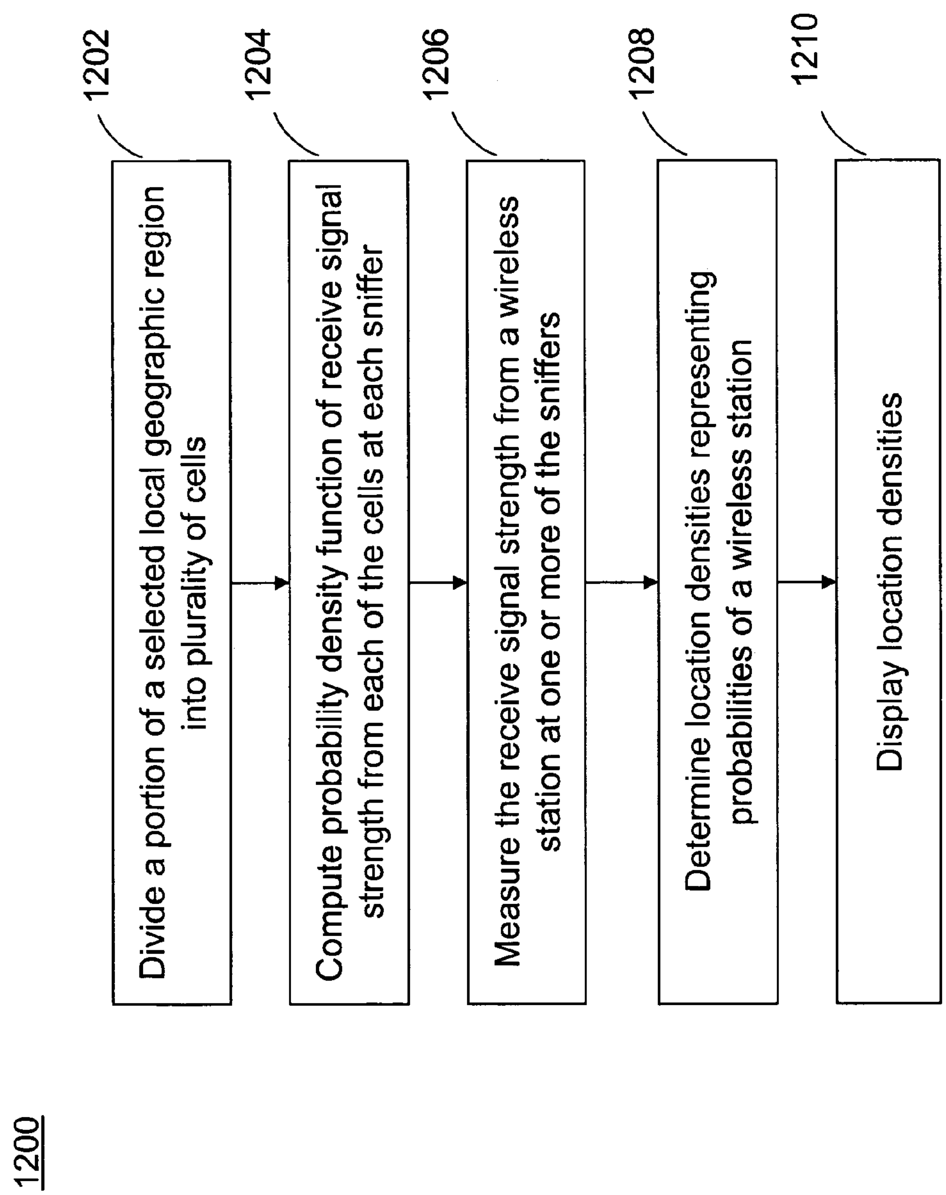
FIG. 12 illustrates a method to create receive signal strength model and determine probabilities of wireless station locations according to another embodiment of the present invention.

One specific embodiment according to present invention for creating receive signal strength model and determining the probabilities of the wireless station being located at one or more of locations within the selected geographic region is now described with reference to FIG. 12. This diagram is merely an example, which should not unduly limit the scope of the claims herein. One of ordinary skill in the art would recognize many variations, modifications, and alternatives. This method 1200 can be used for the step 220. In step 1202 of the method 1200, at least a portion of the selected geographic region (i.e. in a computer model) is divided into plurality of cells. Each of the cells may be rectangular, circular, hexagonal or any other appropriate shape. The cells should be as small in size as possible (e.g., 1 millimeter by 1 millimeter square shaped). Cells typically represent points rather than areas. Cells are represented in the computer representation via their co-ordinates in 2 dimensional (e.g. x coordinate and y coordinate) or three dimensional (e.g. x, y and z coordinates) space as applicable.

At step 1204, the signal model is created to represent the receive signal strength at each of the sniffer devices from the transmission of a given power level (e.g., 0 dBm) emanating from each of the cells. In order to account for the variability of received signal strength in practical deployments due to number of factors such as environmental conditions, imprecise knowledge of materials that various obstacles are made of, movement of people within the selected geographic region, varying signal transmission characteristics of wireless stations manufactured by different vendors, antenna radiation patterns, device orientations and so on, the signal model preferably represents the probability density function of the received signal strength. The probability density function represents the probability of the received signal strength being within a given interval for a range of intervals. For example, the probability density function is the Gaussian density function.

In step 1206 (which typically is executed at the time of location determination of specific wireless station), the receive signal strength from transmission emanating from the wireless station is measured by one or more sniffers.

In step 1208, the "location density" L(x,y) defined as the probability of the received signal strength from the transmission emanating from the cell with coordinates (x,y) being within a small interval around each of the measured signal strength values at the one or more sniffers, is computed. This computation is based on the probability density function for the received signal strength calculated in the previous step. The value of transmit power level 'p' required for this computation can often be determined from the vendor information of the wireless transmitter in the wireless station. The vendor information can be derived from the first 3 bytes of the MAC address of the wireless station. By principle of conditional probability, the probability of the wireless station being located at cell (x,y) is then proportional to L(x,y). The values of L(x,y) or other values that are proportional to L(x,y) are then shown on the display of computer representation of the selected geographic region in step 1210, using plurality of colors or gradations of one or more colors. Alternatively, the various ranges of these values can be shown.

An additional step in a specific embodiment of the above method is performed when the value of 'p' cannot be determined from vendor information of the wireless transmitter, for example, due to the fact that said vendor's transmitter device allows for multiple possibilities of transmit powers. This step is based on the principle of "hypothesis testing". In this step, the values of L(x,y) are computed for all transmit power levels that are known to be transmitted by said wireless transmitter. In a specific embodiment based on principle of "maximum likelihood estimate", the values of L(x,y) at all cells are added together for each of the power levels and the power level for which the sum is maximum is taken to be the estimate of transmit power. In one embodiment, the values of L(x,y) for this most likely transmit power are displayed. In an alternative embodiment, the value displayed at any cell is proportional to the sum total of L(x,y) at that cell over all possible transmit powers. The hypothesis testing principle can also be applied to account for factors including, but not limited to, antenna orientation of the wireless station. Though specific embodiments of methods to determine/display physical location were described, various alternatives are possible and will be apparent to those skilled in the art. Also, steps can be added, removed, or interchanged.

Figure 13A:
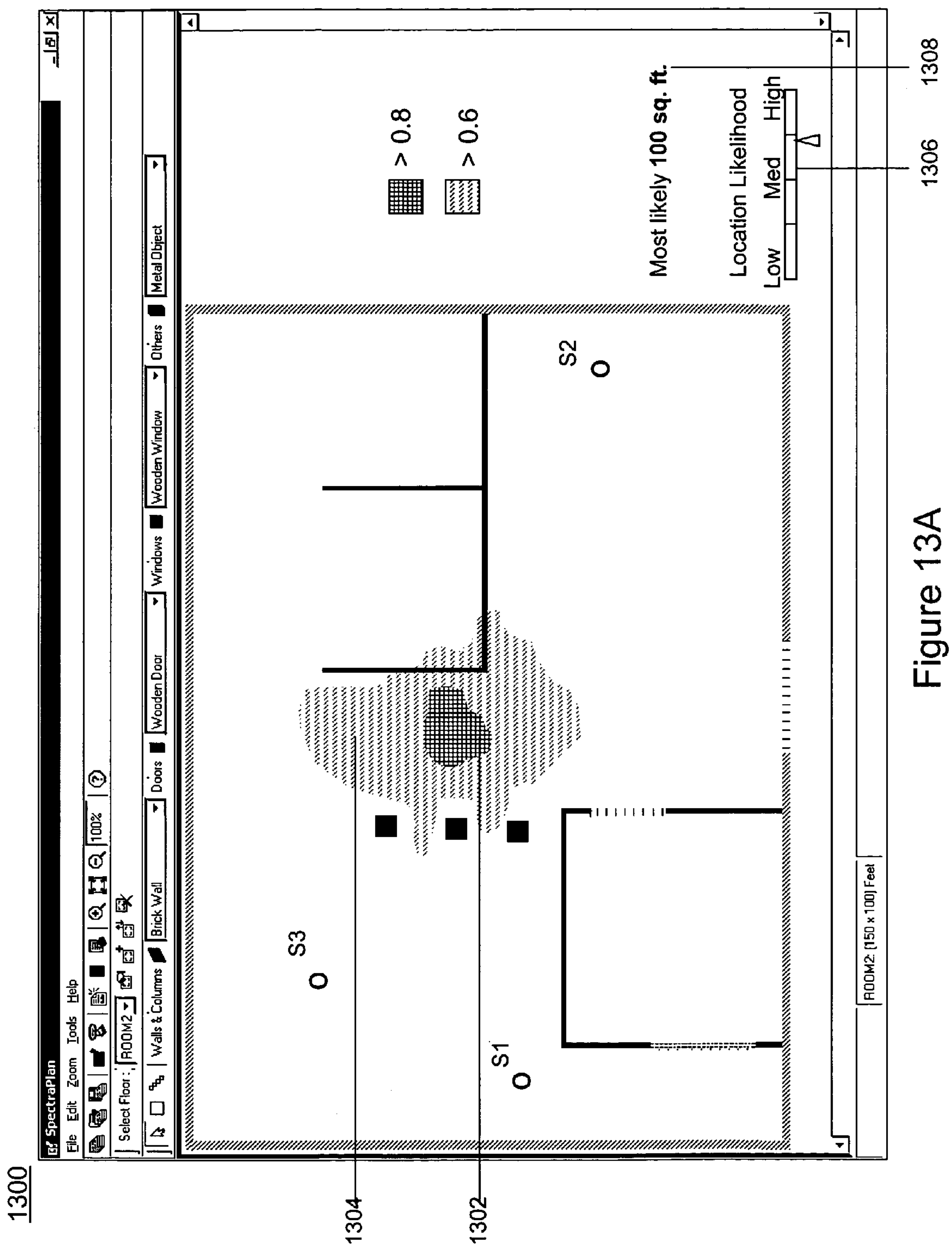
FIG. 13A shows an example of a computer screenshot illustrating location probabilities in relation to the layout of FIG. 9B and the sniffer configuration of FIG. 9E, according to a specific embodiment of the present invention.

FIG. 13A shows an example of a computer screenshot 1300 illustrating location probabilities in relation to the layout of the selected geographic region according to an embodiment of the present invention. This diagram is merely an example, which should not unduly limit the scope of the claims herein. One of ordinary skill in the art would recognize many variations, modifications, and alternatives. As shown merely by way of example, two regions 1302 and 1304 corresponding to different probability ranges (e.g., more than 0.8 and more than 0.6, respectively) are seen. Using the input screen 1306 (e.g. the slider bar), the user can select a location likelihood level. In an exemplary specific embodiment, when the selected location likelihood is larger, the cells for which location density is larger are displayed. This advantageously enables zeroing in on the most likely locations (e.g. by choosing a larger value for the location likelihood level) or see wider distribution (e.g. by choosing a smaller value for the location likelihood level). Using the input screen 1308, the user can also specify the area of most likely locations that he or she desires to view.

Figure 13B:
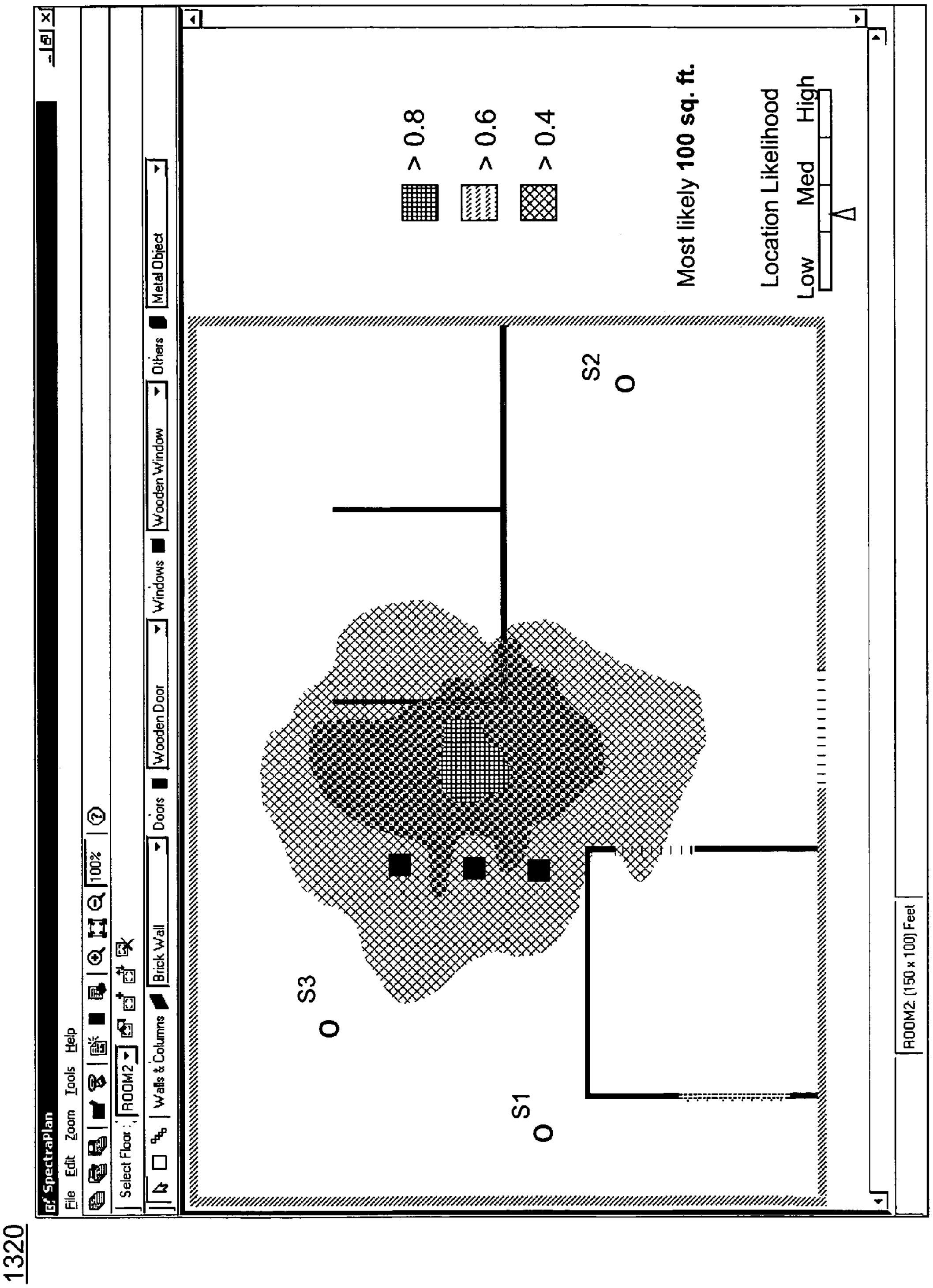
FIG. 13B shows an example of a computer screenshot illustrating location probabilities in relation to the layout of FIG. 9B and the sniffer configuration of FIG. 9E, according to another specific embodiment of the present invention.

FIG. 13B shows another example of a computer screenshot 1320 illustrating location probabilities in relation to the layout of the selected geographic region according to another embodiment of the present invention. This diagram is merely an example, which should not unduly limit the scope of the claims herein. One of ordinary skill in the art would recognize many variations, modifications, and alternatives. As shown, the screenshot 1320 corresponds to a smaller location likelihood level, compared to screenshot 1300.

In addition to providing indication of the source of unauthorized (e.g. to be denied) wireless activity, the technique according to an aspect of the invention, can electronically disable, disrupt, restrict or forbid wireless communication attempts (called "Over the Air" or "OTA prevention") by one or more wireless devices that are associated with the unauthorized wireless activity. By virtue of OTA prevention, the detected unauthorized wireless device is advantageously prevented from inflicting any intrusion or denial of service attacks on the local area network until the device is permanently (e.g. physically) removed from the network. Thus for example, if the intruder device is detected in the middle of the night, it can be restrained from communicating until, for example, the system administrator arrives in the morning, and physically tracks (e.g. using location indication method discussed before), and removes it from the vicinity of the network.

While conventional OTA prevention techniques are brute force and ad hoc (i.e., based on radio jamming, inflicting packet collisions thereby shutting down entire radio channel); the OTA prevention method according to method of present invention can selectively disable the unauthorized devices. Additionally, the present invention provides efficient OTA prevention methods. That is, they can achieve a high level of disruption to unauthorized device's communication capabilities with a low computational overhead on the sniffer and a less number of packet transmissions on the radio channel. Smaller overhead on the sniffer means the sniffer is also able to perform monitoring tasks while it is performing OTA prevention. Or, the sniffer can perform OTA prevention on more than one devices simultaneously, thus endowing the system with capability to resist multiple simultaneous attacks. Minimum packet transmissions yield dividends in terms of not hogging up the radio channel during OTA prevention process. Thus, if the unauthorized device is operating on the same channel as authorized device, the authorized communication can continue when OTA prevention is being applied. Additionally, the conventional OTA prevention techniques quickly fall apart when there is high background traffic on the link.

Conventional OTA prevention techniques themselves are denial of service (DOS) techniques and hence ineffective against mitigating DOS attacks. The method of present invention has significant advantage as it can mitigate unauthorized devices launching DOS attacks (e.g. deauthentication flood, disassociation flood, authentication flood, association flood) on the network.

Figure 14:
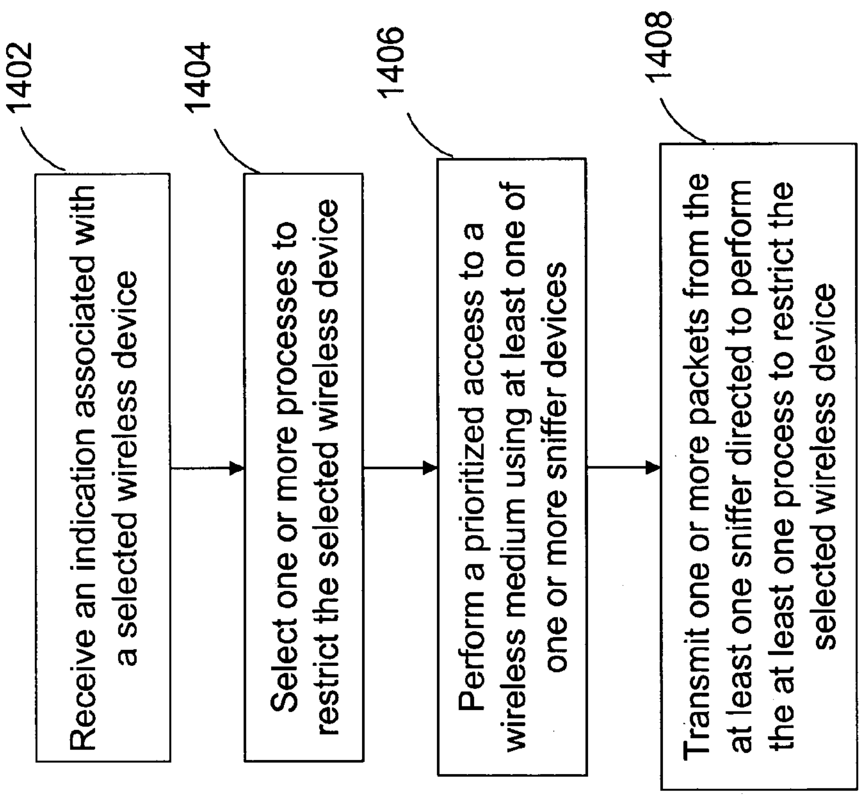
FIG. 14 illustrates a method for over the air prevention of unauthorized wireless activity according an embodiment of the present invention.

A specific embodiment of the OTA prevention method 1400 according to present invention is illustrated in FIG. 14. This diagram is merely an example, which should not unduly limit the scope of the claims herein. One of ordinary skill in the art would recognize many variations, modifications, and alternatives. The method 1400 can be used for the step 220. As shown, the method includes receiving an indication comprising identity information, step 1402. The indication is preferably associated with a selected wireless device engaged in a to be denied wireless activity within or in a vicinity of the selected local geographic region. For example, the identity information comprises a MAC address of the selected wireless device.

The method includes selecting one or more processes directed to restrict the selected wireless device from engaging in wireless communication as shown in step 1404. The process can include, but not limited to, AP flooding, forced deauthentication, virtual jamming, selective virtual jamming, and ACK collision.

In one specific embodiment, a library that stores information about specific behavior of the wireless devices is built and maintained. The devices (APs, radio cards for PCs, chipsets etc.) from different vendors, even though standard compliant, often exhibit different implementation specific behavior. Such behavior is inferred by performing experiments on the devices in a controlled environment such as laboratory environment. Alternatively, it can be inferred via observations made by the sniffers in an operational wireless network.

As merely an example, the library can provide information about whether a specific OTA prevention technique is effective at all against specific device. The library is merely an example, which should not unduly limit the scope of the claims herein. This is important because certain implementations may have mechanisms to specifically foil certain OTA prevention techniques in the interest of preventing DOS attacks. The library may further provide information about values of one or more parameters to be used during application of specific OTA prevention technique for it to be most effective against the specific wireless device. The following table shows merely an example of the library.

For AP flooding:

Cisco AP 350 series: Required associations=128, Detects MAC spoofing

Proxim AP 600 series: Required associations=256, Does not detect MAC spoofing

For forced deauthentication:

Cisco Aironet client card: Transmit 1 deauthentication packet every 50 ms

Linksys client card: Transmit 1 deauthentication packet every 800 ms

Card with MAC address 00:0B:00:00:3B:EF: Transmit 1 deauthentication packet every 35 ms For virtual jamming:

Cisco AP 350 series: Use beacon packet with large NAV value

Proxim AP 600 series: Use RTS packet with large NAV value

Client card with MAC address 00:45:00:00:3B:EF: Use CTS packet

Linksys client card: Not effective

For ACK collision:

Linksys client card: Use a different preamble

Cisco client card: Use a smaller SIFS and low transmission rate

Proxim AP 600 series: Use low transmission rate and transmission on adjacent channel.

As seen, in the foregoing example, the knowledge base says among others that a total of 128 connection requests need to be sent by the sniffer to crash Cisco 350 series AP. It also informs that the AP detects MAC spoofing. That is the AP attempts to detect spoofed source MAC addresses by ensuring if the ACK is transmitted in response to the packets (for example, authentication or association response packets) transmitted by the AP to the source MAC address from which authentication or association request was received. To account for this, as an additional step the sniffer would send acknowledgement to the AP when it detects the transmission of packet from the AP to the MAC address that the sniffer has recently used in the spoofed packet.

The method includes (step 1406) performing a prioritized access to a wireless medium using at least one of one or more sniffer devices. In a specific embodiment, the prioritized medium access involves use of modified or non-standard timing values in the MAC protocol at the sniffer, so that the sniffer can gain prioritized access to the wireless medium. That is, transmission from the sniffer is ensured to occur before the transmission from other wireless stations in the wireless network. For example, the IEEE 802.11 MAC standard compliant devices follow a set of timing constraints for orderly use of the wireless medium. Examples of some of these timing constraints are distributed inter frame space (DIFS) which is the minimum interval of time that the wireless station needs to sense idle wireless medium before attempting new transmission, short inter frame space (SIFS) which is the time interval between the end of packet transmission and the start of transmission of its ACK, slot time which is the unit of time used by wireless stations etc. For example, for direct sequence spread spectrum (DSSS) physical layer DIFS, SIFS and slot time are 50 microseconds, 10 microseconds and 20 microseconds respectively.

Other examples of timing constraints include the parameters of "backoff". After sensing idle wireless medium for DIFS interval, each wireless station in the WiFi network needs to wait for a number of idle time slots (called backoff) before it can transmit a packet. The standard specifies the use of backoff that is uniformly distributed over the interval [0, CW-1] where CW is called contention window. The value CW at any wireless station lies between a minimum (CWmin) and a maximum (CWmax) inclusive. Further, when two or more stations transmit at approximately the same time thus resulting in collision, the value of CW at each of the stations causing collision is increased by a persistence factor (PF). The 802.11b specifies binary exponential backoff wherein, after each collision the contention window CW is doubled, i.e., PF=2. After a successful transmission CW is reset to CWmin.

In a specific embodiment, the sniffer obtains prioritized access to wireless medium using a number of ways, but not limited to, using small (deterministic) backoff such as backoff of 0 or 1 slot, using a smaller CWmin (for example CWmin=1, 3 etc.), using smaller value for slot time, using smaller SIFS, using smaller DIFS, using smaller PF (for example not increasing CW at all or increasing it by less than a factor of 2 after collision), and the like.

As shown the method includes (step 1408) transmitting one or more packets from the at least one of one or more sniffer devices. The packets are directed to perform at least one of the one or more processes to restrict the selected wireless device. For example, the packets can include, but not limited to, deauthentication/dissociation packets (e.g., for forced deauthentication), connection request packets (e.g., for AP flooding), high NAV value packets (e.g., for virtual jamming), and packets directed to create colliding ACKs or interference.

The method of invention can achieve one or more desirable objectives of OTA prevention such as for example minimizing the adverse impact of OTA prevention on authorized devices, maximizing the impact on unauthorized devices, minimizing the computational overhead on the sniffers, minimizing wastage of wireless bandwidth, selectively stopping the unauthorized devices, selectively allowing authorized devices etc.

Figure 15:
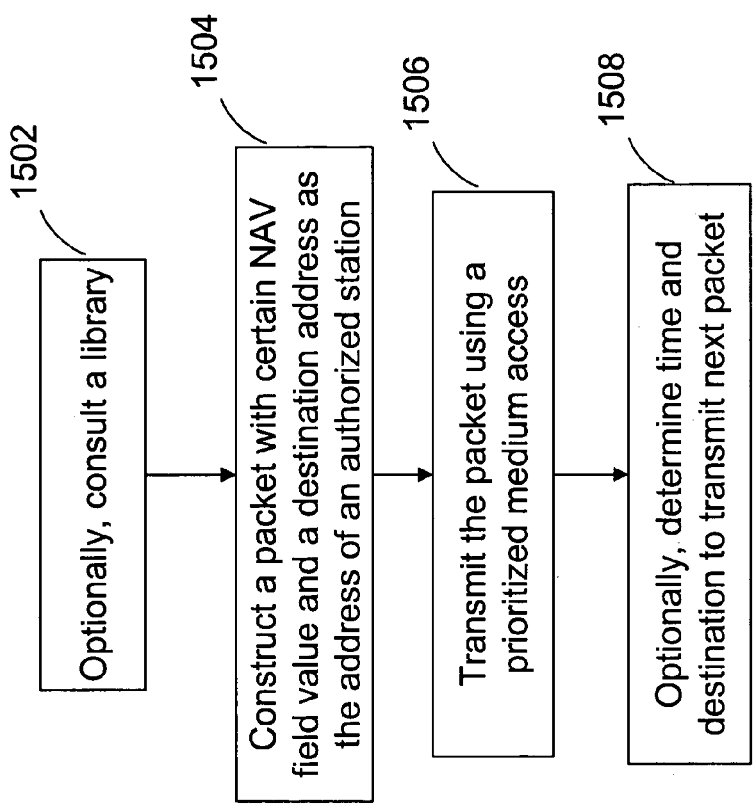
FIG. 15 illustrates a method for selective virtual jamming in accordance with another embodiment of the present invention.

A specific embodiment of the selective virtual jamming for OTA prevention according to present invention is now described. The selective virtual jamming is used to selectively block transmissions of one or more specific wireless stations, as opposed to blocking all the stations in a BSS or an ad hoc network. This is particularly useful if a given BSS or an ad hoc network comprises both authorized and unauthorized stations. This technique exploits the fact that according to the IEEE 802.11 standard a station that is the destination of a packet need not honor the value in the NAV field. An example embodiment of this method to selectively disrupt stations in a BSS or an ad hoc network is now described with reference to FIG. 15. This diagram is merely an example, which should not unduly limit the scope of the claims herein. One of ordinary skill in the art would recognize many variations, modifications, and alternatives. This method can be used for the step 220.

As shown, step 1502 corresponds to the optional step of querying the library for obtaining information specific to one or more stations. For example, the library can indicate if the specific station honors NAV field in all the packets or specific type of packets such as CTS (clear to send) packets.

In step 1504, a packet with a destination address of an authorized station and a certain NAV field value (for example 500) is constructed. In step 1506 said packet is transmitted by the sniffer. Optionally, prioritized medium access is used to transmit said packet. All the stations that receive this packet except the destination station will defer access to the wireless medium for at least the time period equal to the NAV value. During this interval, said destination station gets opportunity to transmit. In step 1508, the appropriate time to transmit the next packet from the sniffer and the destination address for the packet are determined. For example, transmission opportunities can be provided to authorized stations in a round robin fashion or according to some other scheduling policy such as variants round robin (weighted, hierarchical, multiclass, deficit etc.), weighted fair queuing, and the like.

According to an aspect of the present invention, the various OTA prevention processes are applied in an adaptive manner to arrive at an optimal OTA prevention process or an optimal combination of OTA prevention processes according to desirable objective for a given security policy violation event. For a specific OTA prevention process, its effectiveness is determined from the information derived from the library and/or by applying said process and observing its effect on the concerned wireless stations. If said process is deemed ineffective, inefficient or unreliable, a new OTA prevention process or the same process with different parameters is applied instead of or in addition to the current OTA prevention process.

Figure 16:
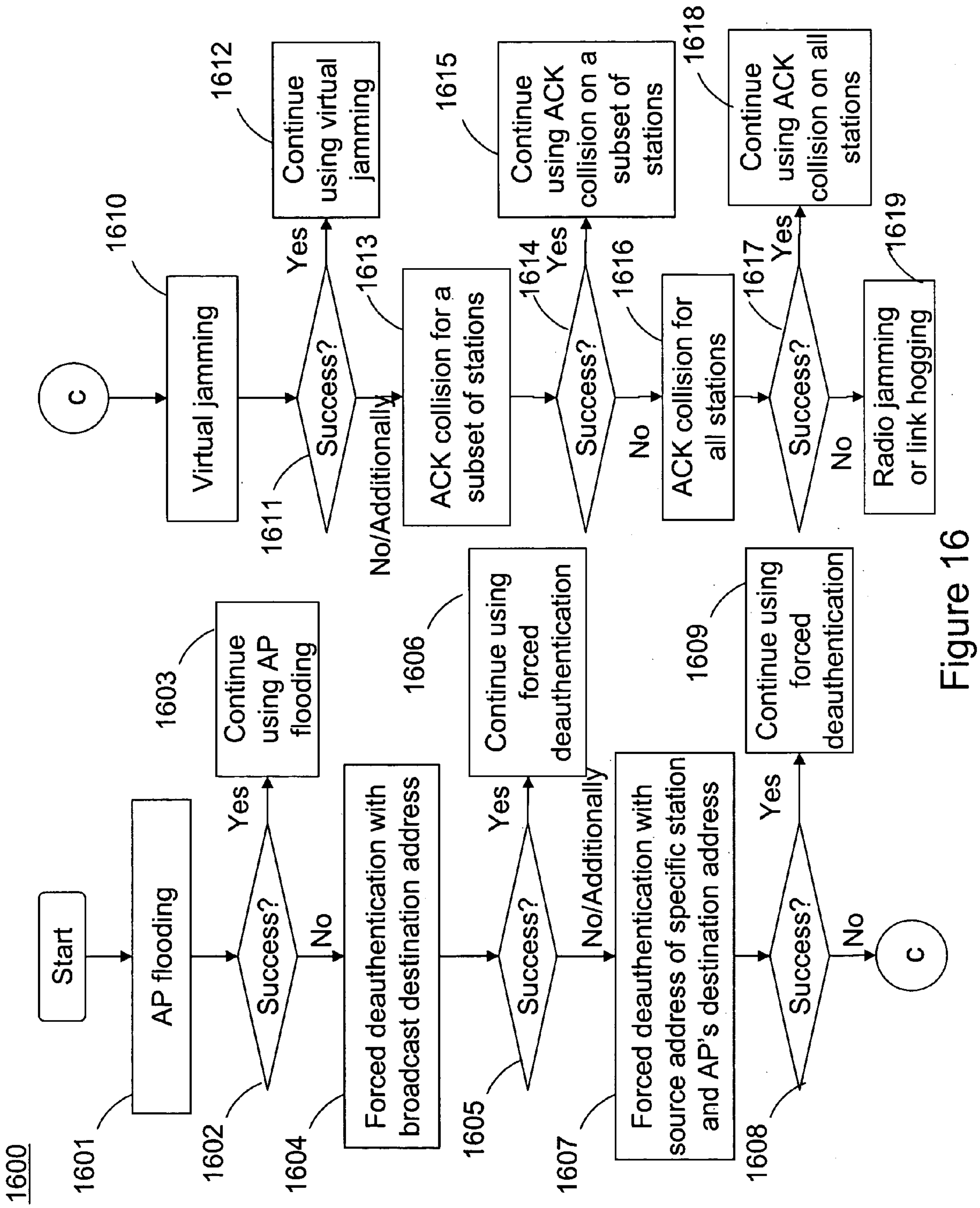
FIG. 16 illustrates a method for adaptive application of prevention processes directed to prevent a selected wireless activity in accordance with a specific embodiment of the present invention.

An example embodiment of the adaptive method 1600 to disrupt a BSS (for example, formed by rogue AP and comprising one or more associated wireless stations) according to present invention in described below with reference to FIG. 16. This diagram is merely an example, which should not unduly limit the scope of the claims herein. One of ordinary skill in the art would recognize other variations, modifications, and alternatives. The method 1600 can be used for the step 220. The adaptive method is applied to achieve prolonged disruption to BSS with limited overhead on the sniffers.

Accordingly in step 1601, the library is consulted to identify if AP flooding is effective against said AP equipment. If it is known to be effective, AP flooding according to the present invention is applied to disrupt the BSS.

In step 1602, the sniffer continues to monitor if the AP is rendered non-usable. For example, the absence of periodic beacon packet transmission from said AP can be used to infer that said AP is non-usable. Alternatively, the absence of any new successful association establishments with the AP by the wireless stations is used to infer that the AP is non-usable. Yet alternatively, the sniffer actively probes the AP by sending a packet that elicits a response. Based on the response or the lack of it, the sniffer infers that the AP is non-usable. In a specific preferred embodiment, the sniffer sends association request to the AP and expects to receive association response with status code "association denied because AP is unable to handle additional associated stations" to infer that the AP is non-usable. Based on these observations, decision is taken as to whether AP flooding yields results to meet the desired objective. That is, whether it indeed makes the AP non-usable and whether the AP remains non-usable for the desired duration of time.

If deemed to be effective, the method continues to apply AP flooding as shown in step 1603. On the other hand, if AP flooding does not perform as desired, the method experiments with the new process.

Thus in step 1604, forced deauthentication/disassociation is used according to the present invention with broadcast address as destination address in the deauthentication packets.

In step 1605, the effect of forced deauthentication/disassociation on the unauthorized BSS is observed. For this the sniffer continues to monitor the transmissions in the BSS. If no transmissions from a specific station are detected, said station is inferred to be disconnected from the AP.

If at least a large subset of stations is inferred to be disconnected from the AP for the desired duration of time, forced deauthentication/disassociation with broadcast address is continued as shown in step 1606.

For the remaining subset of stations, in step 1607 forced deauthentication/disassociation according to present invention is applied with source address as the address of each of the remaining subset of stations and destination address as the address of the AP in deauthentication packets. This is useful to disrupt the station in the BSS that is hidden from the sniffer (for example due to obstacles to radio propagation from the sniffer to the station) and hence could not be disconnected from the AP by broadcast deauthentication packets transmitted from the sniffer.

In step 1608, the sniffer continues to monitor the transmissions in the BSS. The sniffer looks for any communication between the AP and said remaining subset of stations. Alternatively, the sniffer uses active probing in which a spoofed packet (for example class 2 packet) with the source address as the MAC address of the disconnected wireless station is transmitted by the sniffer to the AP. The sniffer further verifies that a deauthentication packet is received from the AP with desired reason code (for example "class 2 frame received from nonauthenticated station").

If the sniffer infers that said remaining subset of wireless stations have been disconnected from the AP, the forced deauthentication/disassociation with said stations' addresses as source addresses is continued as shown in step 1609.

On the other hand, suppose the forced deauthentication/disassociation does not perform as desired, for example due to large number of hidden stations, due to the stations using aggressive authentication and association subsequent to their forced deauthentication, and the like. Then in step 1610 virtual jamming according to the present invention is applied.

In step 1611, the effect of virtual jamming is monitored by the sniffers. For example, lack of detection by the sniffer of any packet transmission to or from said AP can be used to verify that no stations are communicating any more with said AP.

If at least a large subset of stations is inferred to be disabled, virtual jamming is repeatedly applied as shown in 1612.

For the remaining subset of stations, in step 1613 ACK collision according to present invention is applied. In a specific embodiment, colliding ACK is generated whenever packet transmission to the AP from any of the remaining subset stations is detected. Alternatively or in addition to, the colliding ACK is generated whenever packet transmission from the AP to any of the remaining subset of stations is detected. Inflicting such ACK collision is useful to disrupt the station in the BSS that is hidden from the sniffer (for example due to obstacles to radio propagation from the sniffer to the station) and hence could not be disabled by virtual jamming packets transmitted from the sniffer.

In step 1614, the sniffer monitors if any successful communication is happening between the AP and wireless stations on which ACK collision is applied. For example, the sniffer may verify that the packets to or from said stations are being continually retransmitted or the transmission has halted altogether. If so, ACK collision for said remaining subset of stations is continued as shown in step 1615.

On the other hand, if combination of virtual jamming and ACK collision as described above does not perform as desired, for example due to large number of hidden stations or due to large number of stations that do not honor the NAV field in the packet, in step 1616 ACK collision is applied to all packet transmission to the AP. Alternatively or in addition to, the ACK collision is also applied to all packet transmissions by the AP.

In step 1617 the effect of ACK collision is monitored. If successful, ACK collision is continued for all stations in the BSS as shown in step 1618.

On the other hand, if general ACK collision does not perform as desired, finally in step 1619 a brute force technique of radio jamming or link hogging is applied.

The various embodiments may be implemented as part of a computer system. The computer system may include a computer, an input device, a display unit, and an interface, for example, for accessing the Internet. The computer may include a microprocessor. The microprocessor may be connected to a data bus. The computer may also include a memory. The memory may include Random Access Memory (RAM) and Read Only Memory (ROM). The computer system may further include a storage device, which may be a hard disk drive or a removable storage drive such as a floppy disk drive, optical disk drive, jump drive and the like. The storage device can also be other similar means for loading computer programs or other instructions into the computer system.

As used herein, the term 'computer' may include any processor-based or microprocessor-based system including systems using microcontrollers, digital signal processors (DSP), reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term 'computer'. The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms 'software' and 'firmware' are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for monitoring a selected region of an airspace associated with local area networks of computing devices, the method comprising:

providing one or more segments of a legacy local area network to be protected in a selected geographic region, the legacy local area network being characterized by an unsecured airspace within the selected geographic region;

determining a security policy associated with the one or more segments of the legacy local area network, the security policy at least characterizing a type of wireless activity in the unsecured airspace to be permitted, denied, or ignored;

connecting one or more sniffer devices into the legacy local area network, the one or more sniffer devices being spatially disposed within the selected geographic region to cause at least a portion of the unsecured airspace to be secured according to the security policy;

coupling a security appliance to the legacy local area network;

determining if at least one of the sniffer devices is coupled to each of the one or more segments of the legacy local area network to be protected;

determining if the one or more sniffer devices substantially covers the portion of the unsecured airspace to be secured;

monitoring wireless activity in the airspace using the one or more sniffer devices;

automatically classifying, using a classification process, a portion of information associated with the monitoring of the wireless activity to at least determine if the wireless activity communicates to at least one of the one or more segments to be protected;

detecting a violation of the security policy based upon at least the classifying of the portion of the information from the monitoring of the wireless activity; and automatically processing an action associated with the violation in accordance to the security policy for the one or more segments in the legacy local area network to be protected.

2. The method of claim 1 wherein the action is selected from raising an alert and/or logging an alert, the logging comprising a time and date stamp.

3. The method of claim 1 wherein the action comprises a selective prevention process directed to selectively restricting one or more wireless devices associated with the violation of the security policy, the selective restriction comprising preventing an engagement in wireless communication of the one or more wireless devices with the legacy local area network.

4. The method of claim 1 wherein the action comprises a selective prevention process directed to restricting one or more wireless devices associated with the violation of the security policy from engaging in wireless communication without detrimentally influencing any of the other wireless devices; wherein the selective prevention process has been provided using at least the automatic classification process.

5. The method of claim 1 wherein the legacy local area network is coupled to the Internet through a conventional firewall.

6. The method of claim 1 wherein the legacy local area network is a trusted network.

7. The method of claim 1 wherein the unsecured airspace comprises one or more unauthorized wireless signals transferred therein.

8. The method of claim 1 wherein the unsecured airspace is susceptible to one or more intrusions into the legacy local area network using the unsecured airspace.

9. The method of claim 1 wherein the unsecured airspace is susceptible to one or more denial of service attacks on the legacy local area network using the unsecured airspace.

10. The method of claim 1 wherein the unsecured airspace is airspace in a vicinity of the connection point to the local area network.

11. The method of claim 10 wherein the connection point is an Ethernet port.

12. The method of claim 10 wherein the connection port is a wireless access point.

13. The method of claim 1 wherein the legacy local area network comprises one or more computing devices having a wireless transmitter/receiver.

14. The method of claim 1 wherein the security policy is one of a plurality of security policies.

15. The method of claim 1 wherein the to be denied wireless activity is associated with an unauthorized wireless device.

16. The method of claim 1 wherein the to be ignored wireless activity is associated with a friendly neighbor's wireless device.

17. The method of claim 1 wherein the to be ignored wireless activity is associated with a wireless device that is not connected to the segment of the legacy local area network to be protected.

18. The method of claim 1 wherein the to be denied wireless activity is associated with an authorized wireless device that is not at a predetermined physical location.

19. The method of claim 1 wherein the to be denied wireless activity is associated with an authorized wireless device that is not connected into a predetermined segment of the local area network.

20. The method of claim 1 wherein the to be denied wireless activity is associated with an unauthorized wireless device connected into the one or more segments of the local area network to be protected.

21. The method of claim 1 wherein the to be denied wireless activity is associated with a misconfigured authorized wireless device.

22. The method of claim 1 wherein the to be denied wireless activity is associated with an unauthorized wireless device masquerading as an authorized wireless device.

23. The method of claim 1 wherein the classification process determining if at least one wireless device involved in the wireless activity is directly connected to the local area network.

24. The method of claim 1 wherein the classification process further comprising determining if at least one wireless device involved in the wireless activity is unauthorized.

25. The method of claim 1 wherein the classification process includes transmitting one or more test signals in the airspace using at least one of the one or more sniffer devices.

26. The method of claim 1 wherein the classification process includes transferring one or more test signals into the segment of the legacy local are network to be protected or monitored, using at least one of the one or more sniffer devices.

27. The method of claim 1 wherein the classification process does not transmit test signals in the airspace.

28. The method of claim 1 further comprising displaying an indication associated with the violation of the wireless security policy on a user interface of a display coupled to the security appliance.

29. The method of claim 28 further comprising displaying a probability distribution of a physical location of a wireless device causing the violation in relation to a spatial layout of the selected geographic region.

30. The method of claim 28 wherein the indication is associated with an intruder device.

31. The method of claim 1 wherein the determining if the one or more sniffer devices covers is characterized by an ability of the one or more sniffers to prevent a selected portion of wireless activity within the portion of the unsecured airspace.

32. The method of claim 1 wherein the determining if the one or more sniffer devices covers is characterized by an ability of the one or more sniffers to detect a selected portion of wireless activity within the portion of the unsecured airspace.

33. The method of claim 1 wherein the determining if the one or more sniffer devices covers is characterized by a radio coverage of the one or more sniffer devices, the radio coverage is provided using a computer based model of a spatial layout of the selected geographic region.

34. The method of claim 33 wherein the computer based model comprises information selected from at least one or more physical dimensions of one or more layout components, one or more material types of the layout components, and a spatial location of the one or more layout components.

35. The method of claim 33 wherein the computer based model comprises a prediction process.

36. The method of claim 33 further comprising displaying the layout of the selected geographic region on a user interface of a display.

37. The method of claim 36 further comprising dragging and dropping one or more indications associated respectively with the one or more sniffer devices on a user interface of a display coupled to the security appliance.

38. The method of claim 37 further comprising displaying one or more second indications associated with each of the one or more sniffer devices to visually illustrate a radio coverage region for each of the one or more sniffer devices in relation to the layout of the selected geographic region.

39. The method of claim 1 further comprising displaying one or more indications associated with the sniffer coverage and determining if the one or more indications illustrates the substantial coverage in visual form of the portion of the unsecured airspace to be secured.

40. The method of claim 1 further comprising predicting radio signal coverage associated with one or more authorized wireless devices in the legacy local area network; wherein the predicting is based at least on information associated with a spatial layout of the selected geographic region and locations of the one or more authorized wireless devices in relation to the layout.

41. The method of claim 40 further comprising displaying one or more indications associated with at least one of the authorized wireless devices in relation to the layout.

42. The method of claim 40 wherein the location of at least one of the authorized wireless devices is determined based at least on observed receive signal strength from wireless activity originating from the wireless device at one or more of the sniffer devices.

43. The method of claim 40 further comprising generating baseline data for at least one of the sniffer devices, the baseline data including information associated with predicted receive signal strength from the one or more authorized wireless devices, wherein the information is based on a location of the sniffer device in the selected geographic region.

44. The method of claim 1 wherein the classification process comparing a portion of information associated with the monitoring of the wireless activity with baseline data associated with each of the sniffer devices.

45. The method of claim 1 further comprising filtering traffic associated with the communication of a device causing the violation in a port in the legacy local area network.

46. A method for monitoring and displaying selected wireless activity in a selected geographic region, the method comprising:

- providing one or more segments of a legacy local area network to be protected in a selected geographic region, the legacy local area network being characterized by an unsecured airspace within the selected geographic region;
- displaying an illustration of the selected geographic region associated with the one or more segments of the legacy local area network on a computer display;
- determining a security policy associated with the one or more segments of the local area network in the selected geographic region, the security policy at least characterizing a type of wireless activity to be permitted, denied, or ignored;
- connecting one or more sniffer devices into the legacy local area network to be protected within the selected geographic region;
- coupling a security appliance to the legacy local area network;
- determining if at least one of the sniffer devices is coupled to each of the one or more segments of the legacy local area network to be protected;
- determining if the one or more sniffer devices substantially covers a portion of the unsecured airspace to be secured;
- monitoring wireless activity in the airspace associated with the legacy local area network using the one or more sniffer devices;
- automatically classifying a portion of information associated with the monitoring of the wireless activity in the airspace;
- detecting a violation of the security policy based upon at least the classifying of the portion of the information from the monitoring of the wireless activity in the airspace associated with the legacy local area network;
- automatically processing an action associated with the violation in accordance to the security policy for the one or more segments in the legacy local area network;
- displaying an indication associated with the violation in accordance to the security policy for the one or more segments in the legacy local area network;
- displaying a spatial location and associated coverage of one or more of the sniffer devices; and
- displaying a spatial location and associated coverage of at least one access point in the one or more segments of the legacy local area network.

47. The method of claim 46 wherein the indication is an alert.

48. The method of claim 47 wherein the alert comprises text portion.

49. The method of claim 48 wherein the indication is a graphical display of wireless activity associated with the violation of the security policy.

50. The method of claim 46 wherein the indication comprises a location of an intruder device in the selected geographic region.

51. A method for monitoring a selected region of an airspace having multiple wireless signal activities associated with local area network of computing devices comprising one or more network segments, the method comprising:

providing one or more segments of a legacy local area network to be protected in a selected geographic region, the legacy local area network being characterized by an unsecured airspace within or in a vicinity of the selected geographic region;

determining a security policy associated with the one or more segments of the legacy local area network to be protected, the security policy at least characterizing a type of wireless activity in the unsecured airspace to be permitted, denied, or ignored;

coupling one or more sniffer devices into the legacy local area network, the one or more sniffer devices being spatially disposed within or in a vicinity of the selected geographic region to cause at least a portion of the unsecured airspace to be secured according to the security policy;

coupling a security appliance to the legacy local area network;

determining if at least one of the sniffer devices is coupled to each of the one or more segments of the legacy local area network to be protected;

determining if the one or more sniffer devices substantially covers the portion of the unsecured airspace to be secured;

monitoring a plurality of wireless activities in the airspace using the one or more sniffer devices;

automatically classifying, using a classification process, a portion of information associated with the monitoring of the wireless activities to at least determine if the one or more of the wireless activities is coupled to at least one of the one or more segments to be protected;

detecting a violation of the security policy based upon at least the classifying of the portion of the information from the monitoring of the wireless activities, the classifying selectively identifying the violation of the security policy from a plurality of events associated with the wireless activities; and automatically processing an action associated with the violation in accordance to the security policy for the one or more segments in the legacy local area network to be protected, the action comprising a selective prevention process to restrict the one or more wireless devices associated with the violation of the security policy from engaging in wireless communication with the legacy local area network without detrimentally influencing any of the other wireless devices.

52. A method for monitoring a selected region of an airspace associated with local area networks of computing devices, the method comprising:

providing one or more segments of a legacy local area network to be protected in a selected geographic region, the legacy local area network being characterized by an unsecured airspace within the selected geographic region;

determining a security policy associated with the one or more segments of the legacy local area network, the security policy at least characterizing a type of wireless activity in the unsecured airspace to be permitted, denied, or ignored;

connecting one or more sniffer devices into the legacy local area network, the one or more sniffer devices being spatially disposed within the selected geographic region to cause at least a portion of the unsecured airspace to be secured according to the security policy;

coupling a security appliance to the legacy local area network;

determining if the one or more sniffer devices substantially covers the portion of the unsecured airspace to be secured;

monitoring wireless activity in the airspace using the one or more sniffer devices;

automatically classifying, using a classification process, a portion of information associated with the monitoring of the wireless activity to at least determine if the wireless activity communicates to at least one of the one or more segments to be protected;

detecting a violation of the security policy based upon at least the classifying of the portion of the information from the monitoring of the wireless activity; and automatically processing an action associated with the violation in accordance to the security policy for the one or more segments in the legacy local area network to be protected.

* * * * *